United States Patent
Uehara et al.

(10) Patent No.: US 9,841,109 B2
(45) Date of Patent: Dec. 12, 2017

(54) SHAFT SEAL MECHANISM AND ROTARY MACHINE PROVIDED WITH SAME

(75) Inventors: Hidekazu Uehara, Tokyo (JP); Tanehiro Shinohara, Tokyo (JP); Shin Nishimoto, Tokyo (JP); Takashi Nakano, Tokyo (JP); Masato Araki, Tokyo (JP); Tatsuji Takahashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 46 days.

(21) Appl. No.: 13/818,190

(22) PCT Filed: Oct. 26, 2011

(86) PCT No.: PCT/JP2011/074669
§ 371 (c)(1),
(2), (4) Date: Feb. 21, 2013

(87) PCT Pub. No.: WO2012/057204
PCT Pub. Date: May 3, 2012

(65) Prior Publication Data
US 2013/0154195 A1    Jun. 20, 2013

(30) Foreign Application Priority Data
Oct. 27, 2010    (JP) .................. 2010-241001

(51) Int. Cl.
*F16J 15/447*    (2006.01)
*F01D 11/02*    (2006.01)
*F16J 15/3292*    (2016.01)

(52) U.S. Cl.
CPC .......... *F16J 15/447* (2013.01); *F01D 11/025* (2013.01); *F16J 15/3292* (2013.01); *F05D 2240/57* (2013.01)

(58) Field of Classification Search
CPC ...... F16J 15/16; F16J 15/3276; F16J 15/4472; F16J 15/3292; F16J 15/447; F01D 11/02;
(Continued)

(56) References Cited

U.S. PATENT DOCUMENTS

| | | |
|---|---|---|
| 5,351,971 A | 10/1994 | Short |
| 6,267,381 B1 | 7/2001 | Wright |

(Continued)

FOREIGN PATENT DOCUMENTS

| | | |
|---|---|---|
| CN | 1550699 | 12/2004 |
| CN | 1573023 | 2/2005 |

(Continued)

OTHER PUBLICATIONS

Korean Office Action issued Feb. 14, 2014 in corresponding Korean Patent Application No. 10-2013-7004180 with English translation.
(Continued)

*Primary Examiner* — Nathan Cumar
(74) *Attorney, Agent, or Firm* — Wenderoth, Lind & Ponack, L.L.P.

(57) ABSTRACT

A shaft seal structure capable of preventing a seal body of the shaft seal structure of a rotation body from being held in an inclined posture even when the seal body is inclined is provided. It includes, an accommodation body (9), a seal body (12) including thin plate seal pieces (20), and a plate body (17) covering one end in the axial direction (20*d*) of the seal body (12). A recessed portion (31) recessing in the axis direction, and a protruding portion projecting to the other side from the recessed portion (31) are formed on one of the plate surface (17*c*) of the plate body (17) and the inner wall surface (9*e*) of the accommodation body (9). When the protruding portion abuts the other side and a pocket (X), the recessed portion (31) communicates with the pocket (X) and the fluid low pressure region.

11 Claims, 16 Drawing Sheets

(58) Field of Classification Search
CPC ... F01D 11/001; F01D 11/025; F05D 2240/57
USPC ............. 277/345, 355, 418; 415/1, 174.5
See application file for complete search history.

(56) References Cited

U.S. PATENT DOCUMENTS

| | | | | |
|---|---|---|---|---|
| 6,343,792 | B1* | 2/2002 | Shinohara | F01D 11/001 277/345 |
| 7,066,468 | B2* | 6/2006 | Uehara et al. | 277/355 |
| 7,226,053 | B2* | 6/2007 | Nakano et al. | 277/355 |
| 7,261,515 | B2* | 8/2007 | Nishimoto | F16J 15/3292 277/355 |
| 2002/0105146 | A1 | 8/2002 | Uehara et al. | |
| 2002/0117807 | A1* | 8/2002 | Yoshida | F16J 15/3292 277/412 |
| 2005/0012275 | A1* | 1/2005 | Nakano | F16J 15/3292 277/411 |
| 2006/0033285 | A1* | 2/2006 | Nishimoto | F16J 15/3292 277/355 |
| 2007/0102886 | A1* | 5/2007 | Uehara | F01D 11/00 277/355 |
| 2008/0007008 | A1* | 1/2008 | Hoebel et al. | 277/355 |

FOREIGN PATENT DOCUMENTS

| | | |
|---|---|---|
| CN | 1963270 | 5/2007 |
| EP | 1 013 975 | 6/2000 |
| GB | 2 286 434 | 8/1995 |
| JP | 7-151235 | 6/1995 |
| JP | 2002-13647 | 1/2002 |
| JP | 3616016 | 2/2005 |
| JP | 2006-52765 | 2/2006 |
| KR | 10-2010-0036374 | 4/2010 |
| WO | 00/03164 | 1/2000 |

OTHER PUBLICATIONS

International Search Report dated Jan. 24, 2012 in International (PCT) Application No. PCT/JP2011/074669 with English translation.

Written Opinion of the International Searching Authority dated Jan. 24, 2012 in International (PCT) Application No. PCT/JP2011/074669 with English translation.

Chinese Office Action dated Jul. 31, 2014 in corresponding Chinese Patent Application No. 201180040365.1 with partial English translation.

* cited by examiner

SHAFT SEAL MECHANISM AND ROTARY MACHINE PROVIDED WITH SAME

TECHNICAL FIELD

The present invention relates to a shaft seal mechanism which seals a gap between a rotor and a stator and divides the gap into a fluid low pressure region and a fluid high pressure region, and a rotary machine provided with the same.

Priority is claimed on Japanese Patent Application No. 2010-241001, filed Oct. 27, 2010, the content of which is incorporated herein by reference.

BACKGROUND ART

In order to decrease a leak amount of working fluid which flows from a high pressure side to a low pressure side, a shaft seal mechanism is provided around a rotor of a rotary machine such as a gas turbine or a steam turbine. For example, as an example of the shaft seal mechanism, there is a shaft seal mechanism disclosed in PTL 1 below.

The shaft seal mechanism includes a housing which is provided in the stator side of the rotary machine, and a seal body which is accommodated in the housing. The housing includes an accommodation space inside the outer shell, and an opening of the accommodation space is formed toward the outer circumference of a rotor. The seal body includes thin plate seal pieces.

In the seal body, respective thickness directions of the thin plate seal pieces are toward the circumferential direction of the rotor, and the thin plate seal pieces are overlapped with minute gaps to each other. Each thin plate seal piece is disposed to be inclined so that the radially inward end is positioned so as to be closer to the rotation direction side of the rotor than the radially outward end. Moreover, the radially outward end sides are connected to each other and the radially inward ends become free ends.

In the seal body, the radially outward sides are accommodated and supported in the housing, and the radially inward sides extend from the opening of the housing toward the circumference of the rotor.

In the shaft seal mechanism which is schematically configured as described above, the radially inward side of each thin plate seal piece contacts the rotor when the rotor is stopped. However, if the rotor is rotated, the radially inward side floats from the outer circumference of the rotor due to a dynamic pressure effect generated by rotation of the rotor and does not contact the rotor. Thereby, in the shaft seal mechanism, wear of each thin plate seal piece is suppressed, and service life of the seal is lengthened.

In the shaft seal mechanism disclosed in PTL 1, one end in the axial direction of a fluid low pressure region side of the seal body is covered by a side seal plate of the low pressure side. The other end in the axial direction of a fluid high pressure region side of the seal body is covered by a side seal plate of the high pressure side. Moreover, the radial dimensions of the side seal plate of the low pressure side and the side seal plate of the high pressure side are adjusted, sizes in a downstream side space of the one end in the axial direction and an upstream side space of the other end in the axial direction are defined, and thus, gas pressure distribution of the minute gaps is set so as to assist the floating force due to the above-described dynamic pressure effect.

In the shaft seal mechanism, the seal body or the like is accommodated in the housing with a play, the seal body displaces the accommodation space in the axis direction by differential pressure of the fluid, and the side seal plate of the low pressure side which covers one end of the seal body is pressed to the housing. That is, sizes of the upstream side space and the downstream side space of the above-described seal body are designed on the premise of a state where the side seal plate of the low pressure side is pressed to the housing.

CITATION LIST

Patent Literature

[PTL 1] Japanese Patent (Granted) Publication No. 3616016

SUMMARY OF INVENTION

Technical Problem

However, in the above-described shaft seal mechanism, due to dust which is mixed into the accommodation space of the housing, manufacturing errors of the member of the seal body side or the housing, or the like, the radially outward side of the seal body may be restrained in a displaced state in the axis direction. In this case, if the pressure of the fluid acts, the radially inward side of the seal body has a posture in which the radially inward side is inclined to the fluid low pressure region side, the end of the side seal plate of the low pressure side and the housing come into linearly close contact with each other, a pocket which communicates with the fluid high pressure region is formed, a high pressure fluid is filled in the pocket, and there is a problem in that the seal body is pressed to the housing in an inclined posture and held.

The present invention is made in consideration of the above-described circumstances, and an object thereof is to prevent the inclined posture of the seal body from being held even when the seal body has the inclined posture.

Solution to Problem

In order to achieve the object, the present invention includes the following means.

(1) There is provided a shaft seal mechanism which seals a gap between a stator which surrounds an outer circumference of a rotor of a rotary machine and the rotor, and divides the gap into a fluid low pressure region on one side of the rotor in an axial direction and a fluid high pressure region on other side of the rotor in the axial direction, including: an accommodation body which is provided in the stator and in which an accommodation space extending in a circumferential direction is formed and an opening of the accommodation space is formed toward the outer circumference of the rotor; a seal body which includes a plurality of thin plate seal pieces which are overlapped with minute gaps to each other in the circumferential direction of the rotor and in which a radially outward end side is accommodated in the accommodation space of the accommodation body and a radially inward end extends toward the outer circumference of the rotor from the opening; a plate body which covers the one side end of the seal body in the axial direction and in which a plate surface of the plate body facing the one side in the axial direction is pressed to an inner wall surface of the accommodation body facing to the plate surface in the axis direction by a pressure of the fluid; and a recessed-protruding portion which is formed on at least one of the plate surface of the plate body and the inner wall surface of the accommodation body and which includes a recessed portion which extends from the radially inward side toward the outward side and is recessed in the axis direction and a protruding portion which projects to the other side from the recessed portion in the radially inward side, wherein the recessed portion of the recessed-protruding portion connects a pocket to the fluid low pressure region, the pocket being formed between the one of the plate surface of the plate body and the inner wall surface of the accommodation body and other of the plate surface of the plate body and the inner wall surface of the accommodation body when the protruding portion abuts to the other of the plate surface of the plate body and the inner wall surface of the accommodation body.

According to this configuration, when the pocket, which communicates with the fluid high pressure region between the plate surface of the plate body and the inner wall surface of the accommodation body, is formed, since the recessed portion communicates with the pocket and the fluid low pressure region, even though the seal body is inclined to the fluid low pressure region side and the pocket is formed between the plate surface and the inner wall surface, and the fluid flows into the pocket from the fluid high pressure region, the fluid flows to the fluid low pressure region via the recess.

Thereby, the high pressure fluid is not filled in the pocket which is formed between the plate surface and the inner wall surface, and it is possible to prevent the seal body from being held in the inclined posture.

(2) In the shaft seal mechanism according to (1), the mechanism further includes a projecting part which is formed in the radially outward side in at least one of the plate surface of the plate body and the inner wall surface of the accommodation body and which projects in the axis direction with respect to the recessed portion, wherein the projecting part blocks off a connection between the fluid high pressure region and the fluid low pressure region by tightly abutting to the other of the plate surface of the plate body and the inner wall surface of the accommodation body when the plate surface is pressed to the inner wall surface of the accommodation body.

According to this configuration, since the communication between the fluid high pressure region and the fluid low pressure region is blocked when the plate surface is pressed to the inner wall surface, the communication between the fluid low pressure region and the fluid high pressure region is blocked when the inclination of the posture of the seal body is eliminated. Thereby, in the posture in which the seal body is inclined, it is possible to suppress the seal body from being held in the inclined posture, and designed seal performance can be secured by blocking the communication between the fluid low pressure region and the fluid high pressure region when the inclination of the posture of the seal body is eliminated.

(3) In the shaft seal mechanism according to (1) or (2), the recessed portion includes a radial extension groove which extends from the radially inward side toward the outward side.

According to this configuration, the recessed portion and the protruding portion can be relatively simply formed.

(4) In the shaft seal mechanism according to (3), the recessed portion includes a circumferential extension groove which is formed in the radially outward side from the radial extension groove, extends in the circumferential direction, and communicates with the radial extension groove.

According to this configuration, since the recessed portion is formed over a wide range in the circumferential direction, the pocket and the fluid low pressure region can easily communicate with each other so as to correspond to the pocket formed at indefinite locations.

(5) In the shaft seal mechanism according to any one of (1) to (4), the recessed-protruding portion is formed only on one of the plate surface of the plate body and the inner wall surface of the accommodation body.

According to this configuration, since the recessed-protruding portion is formed only on one of the plate surface of the plate body and the inner wall surface of the accommodation body, labor and trouble for forming the recessed-protruding portion can be alleviated.

(6) In the shaft seal mechanism according to any one of (1) to (5), the recessed-protruding portion is formed only on the plate surface of the plate body.

According to this configuration, since the recessed-protruding portion is formed only on the plate surface of the plate body, compared to a case where the recessed-protruding portion is formed on the inner wall surface of the accommodation body, the recessed-protruding portion can be easily formed. Moreover, the configuration of the present invention can be obtained by exchanging only the plate body of the existing shaft seal mechanism.

(7) In the shaft seal mechanism according to any one of (1) to (5), the recessed-protruding portion is formed only on the inner wall surface of the accommodation body.

According to this configuration, since the recessed-protruding portion is formed only on the inner wall surface of the accommodation body, compared to a case where the recessed-protruding portion is formed on the plate-like surface, stiffness after the recessed-protruding portion is formed can be relatively easily secured, and a degree of freedom in the shape (for example, range or width of recess) of the recessed-protruding portion can be improved.

(8) In the shaft seal mechanism according to any one of (1) to (4), the recessed-protruding portion is formed on both the plate surface of the plate body and the inner wall surface of the accommodation body, and both protrusions abut each other.

According to this configuration, since the recessed-protruding portion is formed on both the plate surface of the plate body and the inner wall surface of the accommodation body, the depths of both recesses are formed so as to be small, and the communication space between the pocket and the fluid low pressure region can be largely secured.

(9) A rotary machine includes the shaft seal mechanism according to any one of (1) to (8).

According to this configuration, since the rotary machine includes the shaft seal mechanism according to any one of (1) to (8), even when the seal body has an inclined posture, a decrease of a floating force of the thin plate seal piece is suppressed, the service life of the shaft seal mechanism is lengthened, and the rotary machine having improved maintenance can be obtained.

Advantageous Effects of Invention

According to a shaft seal mechanism of the present invention, even when a seal body has an inclined posture, it is possible to prevent the seal body from being held in the inclined posture and suppress a floating force of a thin plate seal piece from being decreased.

According to a rotary machine of the present invention, even when the seal body has an inclined posture, since it is possible to prevent the seal body from being held in the inclined posture and suppress the floating force of the thin plate seal piece from being decreased, the service life of the shaft seal mechanism is lengthened, and the rotary machine having improved maintenance can be obtained.

DESCRIPTION OF EMBODIMENTS

Hereinafter, embodiments of the present invention will be described referring to drawings.

[Configuration of Gas Turbine]

Figure 1:
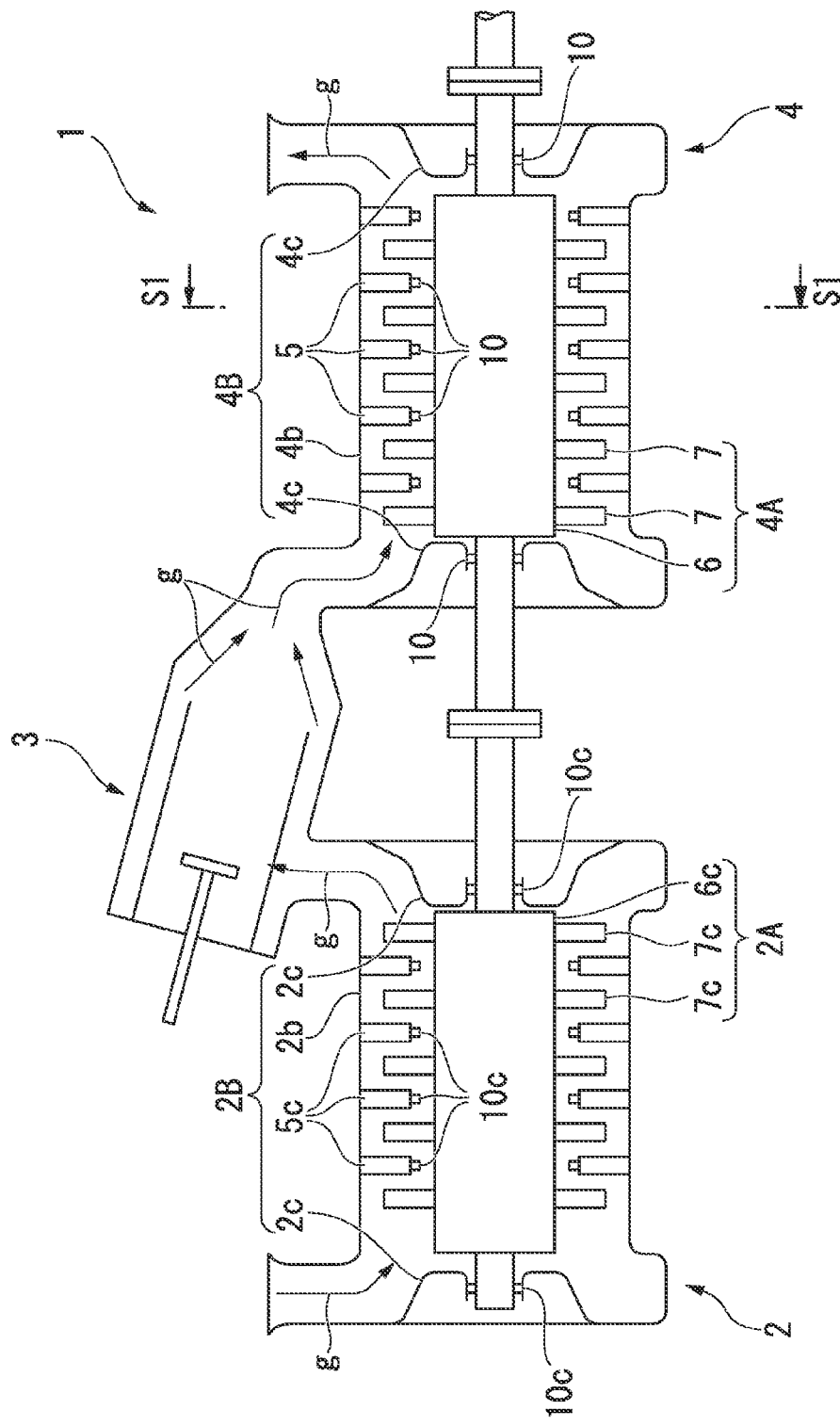
FIG. 1 is a schematic overall configuration view of a gas turbine (rotary machine) 1 according to an embodiment of the present invention.

FIG. 1 is a schematic overall configuration view of a gas turbine (rotary machine) 1 according to an embodiment of the present invention.

As shown in FIG. 1, the gas turbine 1 includes a compressor (rotary machine) 2 which takes a large amount of air in the inner portion and compresses the air, a combustor 3 which mixes the air compressed in the compressor 2 with a fuel and combusts the mixture, and a gas turbine (rotary machine) 4 which converts heat energy of the combustion gas introduced from the combustor 3 into rotational energy.

The compressor 2 and the turbine 4 includes rotors 2A and 4A which are connected to each other so as to be integrally rotated, and stators 2B and 4B which surround the rotors 2A and 4A respectively. Moreover, in descriptions below, unless particularly mentioned, the axial directions of the rotor 2A and 4A are simply referred to as an "axis direction", the circumferential directions of the rotors 2A and 4A are simply referred to as a "circumferential direction", and the radial directions of the rotors 2A and 4A are simply referred to as a "radial direction."

The rotors 2A and 4A include rotary shafts 6c and 6, and annular moving blade groups 7c and 7 which are fixed with gaps therebetween in the axis direction. Each of the annular moving blade groups 7c and 7 is configured so as to include moving blades which are fixed with gaps to each other in the circumferential direction in the outer circumferences of the rotary shafts 6c and 6.

The stators 2B and 4B include casings 2b and 4b, and annular stationary blade groups 5c and 5 which are fixed with gaps therebetween in the axis direction in the casings 2b and 4b respectively. The annular stationary blade groups 5c and 5 include stationary blades which are fixed with gaps to each other in the circumferential direction in the inner surface of each of the casings 2b and 4b. Hub shrouds are formed on the tips of each stationary blade, and the hub shrouds (stator) are connected to each other in the circumferential direction, become annular as a whole, and surround the outer circumferences of the rotary shafts 6c and 6.

The annular stationary blade groups 5c and 5 are alternately disposed in the axis direction with the annular moving blade groups 7c and 7 respectively.

In the compressor 2 and the turbine 4, in order to prevent a working fluid (compressed air or combustion gas) g from being leaked in the axis direction from a high pressure side to a low pressure side, as shown in FIG. 1, shaft seal mechanisms 10c and 10 are provided on hub shrouds of each of the annular stationary blade groups 5c and 5. In addition, also in bearings (stators) 2c and 4c in which the casings 2b and 4b support the rotary shafts 6c and 6, in order to prevent the working fluid g from being leaked from the high pressure side to the low pressure side, the shaft seal mechanisms 10c and 10 are provided.

Hereinafter, embodiments of the shaft seal mechanism 10 of the turbine 4 will be described. Moreover, hereinafter, the shaft seal mechanism 10 of the turbine 4 will be described. However, since the shaft seal mechanism 10c of the compressor 2 also has the same configuration basically, the description thereof is omitted.

[First Embodiment of Shaft Seal Mechanism]

Figure 2:
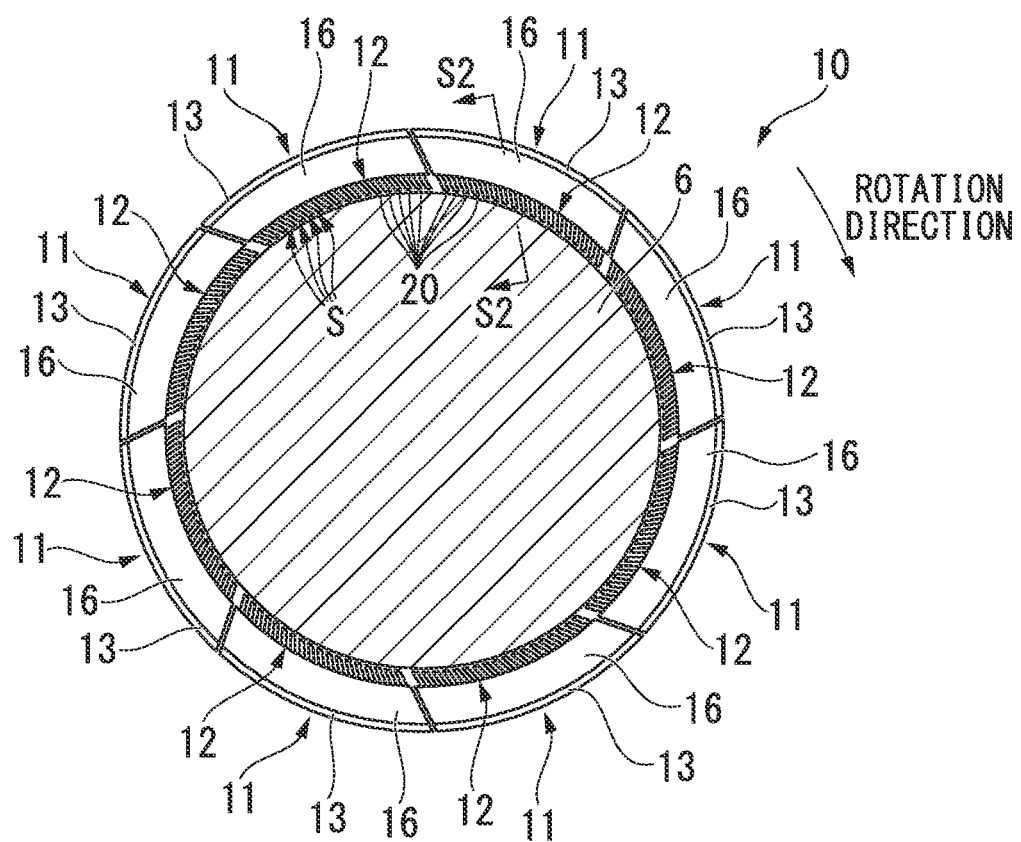
FIG. 2 is a cross-sectional view taken along the line S1-S1 in FIG. 1.
Figure 3:
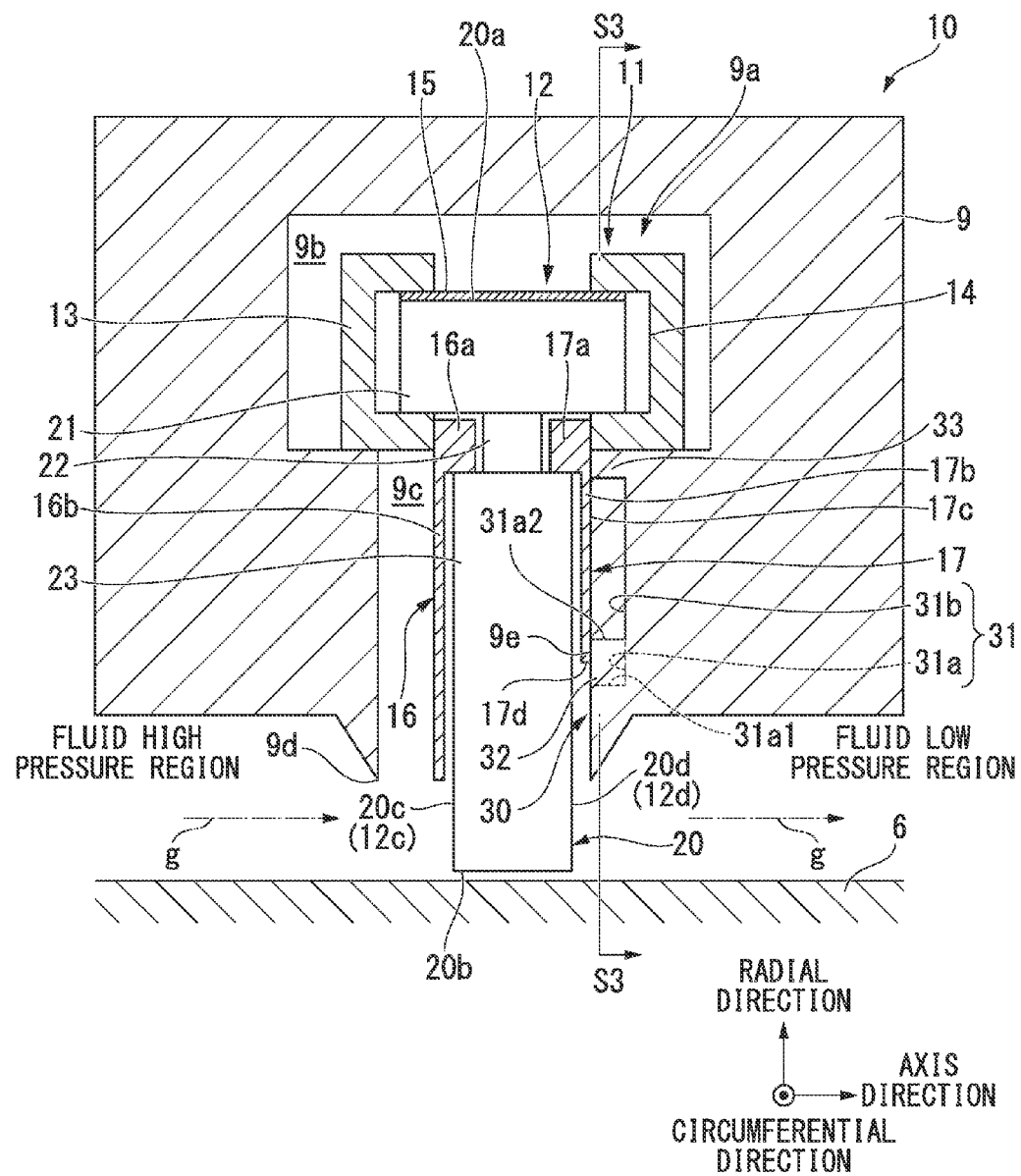
FIG. 3 is a cross-sectional view taken along the line S2-S2 in FIG. 2.

FIG. 2 is a cross-sectional view taken along the line S1-S1 in FIG. 1, and FIG. 3 is a cross-sectional view taken along the line S2-S2 in FIG. 2.

As shown in FIG. 2, a plurality (eight in the present embodiment) of seal segments 11, which extend in an arc-like shape, are disposed in the circumferential direction in an annular housing 9 which is supported to the hub shroud of the annular stationary blade group 5 and the inner circumferential surface of the bearing 4c respectively, and thus, the shaft seal mechanism 10 of the turbine 4 is configured.

The housing 9 extends over the entire circumference in the circumferential direction along the outer circumference of the rotary shaft 6 (refer to FIG. 2), and an annular accommodation space 9a is formed. As shown in FIG. 3, in the accommodation space 9a of the housing 9, the cross-section outline which intersects in the circumferential direction is formed in a T shape, and an outward side space 9b in which the width dimension (axis direction) in the radially outward side is largely formed and an inward side space 9c in which the width dimension in the radially inward side is formed small communicate with each other. Moreover, an opening 9d of the inward side space 9c faces the outer circumference of the rotary shaft 6 of the radially inward side.

As shown in FIG. 3, the seal segment 11 includes a seal body 12 (refer to FIG. 4) which includes thin plate seal pieces 20, retaining rings 13 and 14 which have a U-shaped cross-section and retain the thin plate seal pieces 20, a rear space 15 which is disposed in the housing 9 side of the thin plate seal pieces 20, and side seal plates 16 and 17 which are provided so as to interpose the seal body 12 in the axis direction.

Figure 4:
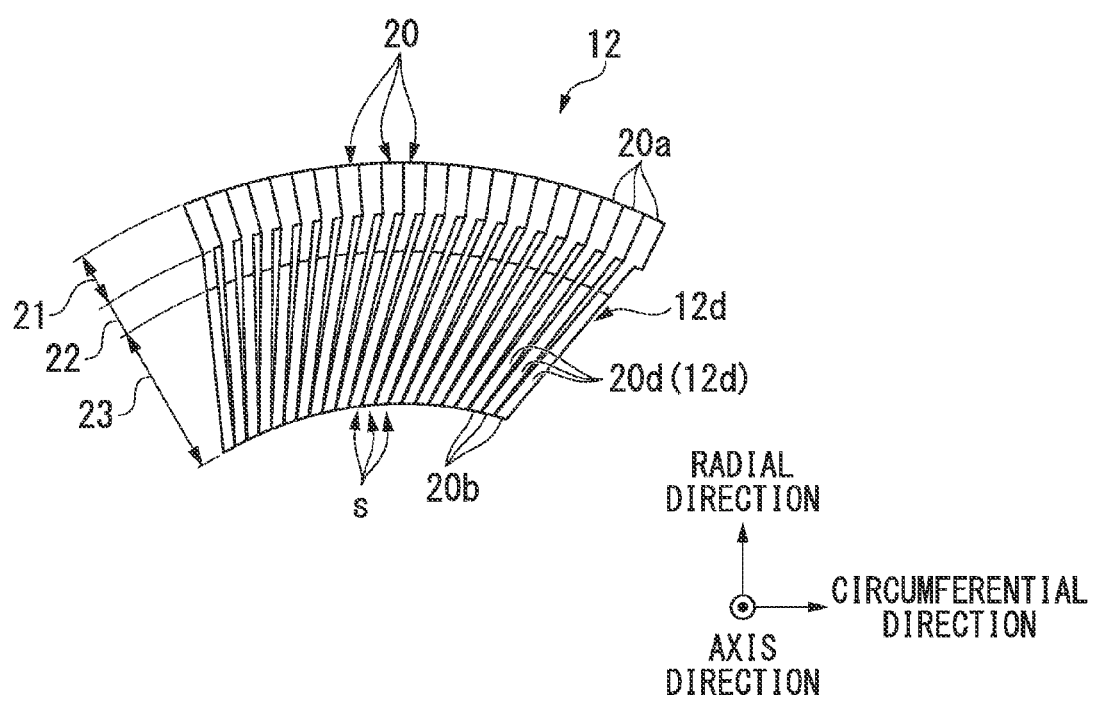
FIG. 4 is a schematic view when a seal segment 11 according to the embodiment of the present invention is viewed from one side in the axial direction to the other side.

FIG. 4 is a schematic view when the seal segment 11 is viewed from one side in the axial direction to the other side.

As shown in FIG. 4, in the seal body 12, the thin plate seal pieces 20 having a thin plate shape are overlapped (refer to FIG. 2), and radially outward ends 20a sides of the plurality sheets of the thin plate seal pieces 20 are connected to each other.

As shown in FIG. 3, the thin plate seal piece 20 is a member, which is mainly formed of a thin steel plate, and is formed in a T shape (reverse T shape) when viewed in the circumferential direction of the rotary shaft 6. In addition, the width direction of the seal piece faces the axis direction of the rotary shaft 6, and in other words, the thickness direction of the seal piece faces the circumferential direction of the rotary shaft 6.

The thin plate seal pieces 20 includes a head portion 21, a body portion 23 in which the width dimension and the thickness dimension are formed so as to be smaller than those of the head portion 21, and a neck portion 22 which is positioned between the head portion 21 and the body portion 23 and in which the width dimension is formed so as to be smaller than those of the head portion and the body portion. In the thin plate seal piece 20, the head portion 21, the neck portion 22, and the body portion 23 are formed in the above order from the outside to the inside in the radial direction of the rotary shaft 6.

In the thin plate seal pieces 20, respective head portions 21 are welded and connected to one another. Moreover, the body portions 23 of the thin plate seal pieces 20 can be elastically deformed, the radially inward ends of respective body portions 23, that is, the radially inward ends 20b of the thin plate seal pieces 20 become free ends. Moreover, during the stopping of the rotary shaft 6, the inward end 20b side of each thin plate seal piece 20 contacts the rotary shaft 6 with a predetermined pre-compression.

As shown in FIG. 4, the thin plate seal pieces 20 are arranged with minute gaps s to each other in the circumferential direction. In the thin plate seal pieces 20, the thickness dimensions of the head portions 21 are larger than the thickness dimensions of the neck portion 22 and the body portion 23, and thus, the minute gap s is formed between the body portions 23 of two thin plate seal pieces 20 adjacent to each other in respective thickness directions.

In the seal body 12 which includes the thin plate seal pieces 20, a high pressure side end (the other end) 12c, in which an end 20c of the body portion 23 side of each thin plate seal piece 20 is collected in plural and forms a small opening shape, faces a fluid high pressure region (the other side in the axial direction), and a low pressure side end 12d, in which an end 20d of the body portion 23 side is collected in plural and forms a small opening shape, faces a fluid low pressure region (the one side in the axial direction).

The retaining rings 13 and 14 each have a U shaped cross-section, in which the inside of the U shape forms a groove, and are arcuate members which extend in the circumferential direction of the rotary shaft 6. The width of the groove (the dimension of the groove in the radial direction of the rotary shaft 6) of each of the retaining rings 13 and 14 is slightly larger than the dimension in the radial direction of the head portion 21 of the thin plate seal piece 20. The fluid high pressure region side (the other side in the axial direction) of the head portion 21 of the thin plate seal piece 20 is put into the groove of the retaining ring 13, and the fluid low pressure region (the one side in the axial direction) of the head portion 21 of the thin plate seal piece 20 is put into the groove of the retaining ring 14. The rear spacer 15 is fitted between the side wall of the groove of each of the retaining rings 13 and 14 and the head portion 21 of the thin plate seal piece 20. Thereby, the head portions 21 of the thin plate seal pieces 20 are retained by the retaining rings 13 and 14.

The thickness directions of the side seal plates 16 and 17 all face the axis direction, and the shapes when viewed in the axis direction of the rotary shaft 6 have arc strip shapes. Moreover, the dimension in the radial direction of the side seal plate 17 is shorter than the dimension in the radial direction of the side seal plate 16.

The side seal plates 16 and 17 include base portions 16a and 17a of the radially outward side and thin plate seal portions 16b and 17b of the radially inward side. The thicknesses (the dimensions in the axis direction) of the base portions 16a and 17a are thicker than the thicknesses of the thin plate seal portions 16b and 17b, and the base portions projects in the axis direction based on the thin plate seal portions 16b and 17b.

The base portion 16a of the side seal plate 16 enters a depression of the high pressure side between the head portion 21 and the body portion 23 of the thin plate seal piece 20, and is inserted between the neck portion 22 of the thin plate seal piece 20 and a tip of a "U" shaped arm portion of the retaining ring 13 having a U shaped cross-section.

In this way, a plate surface 16c facing the other side in the axial direction of the side seal plate 16 covers the most of the high pressure side end 12c in the seal body 12, and the radially inward side of the high pressure side end 12c when viewed in the axis direction is slightly exposed.

The base portion 17a of the side seal plate 17 enters a depression of the low pressure side between the head portion 21 and the body portion 23 of the thin plate seal piece 20, and is inserted between the neck portion 22 of the thin plate seal piece 20 and a tip of a "U" shaped arm portion of the retaining ring 14 having a U shaped cross-section.

In this way, a plate surface 17c facing the one side in the axial direction of the side seal plate 17 covers approximately the half of the radially outward side of the low pressure side end 12d in the seal body 12, and approximately the half of the radially outward side of the low pressure side end 12d when viewed in the axis direction is exposed.

As shown in FIG. 3, the seal segment 11 is accommodated in the accommodation space 9c of the housing 9 with a play.

More specifically, the retaining rings 13 and 14 which retain the head portion 21 of the thin plate seal piece 20 are accommodated in the outward side space 9b of the accommodation space 9a, and the side seal plates 16 and 17 and the body portion 23 of the thin plate seal piece 20 are accommodated in the inward side space 9c of the accommodation space 9a. Moreover, the tip (inward end 20b) of the body portion 23 projects toward the rotary shaft 6 from the opening 9d of the accommodation space 9a.

The retaining rings 13 and 14 interfere with the wall surface of the outward side space 9b of the housing 9, and thus, the displacement of the seal segment 11 in the radial direction is limited. Moreover, the side seal plates 16 and 17 interfere with the wall surface of the inward side space 9c of the housing 9, and thus, the displacement of the seal segment 11 in the axis direction is limited to a predetermined range. In addition, the seal segment 11 is biased to the radially inward side by an elastic body (not shown) which is disposed in the outward side space 9b.

If the gas turbine 1 is operated, the above-described seal segment 11 is displaced to the fluid low pressure region side by the pressure of the combustion gas g, and as shown in FIG. 3, the plate surface 17c of the side seal plate 17 is pressed to the inner wall surface 9e of the housing 9 (inward side space 9c) opposite in the axis direction.

A recessed-protruding portion 30 is formed on the inner wall surface 9e.

Figure 5:
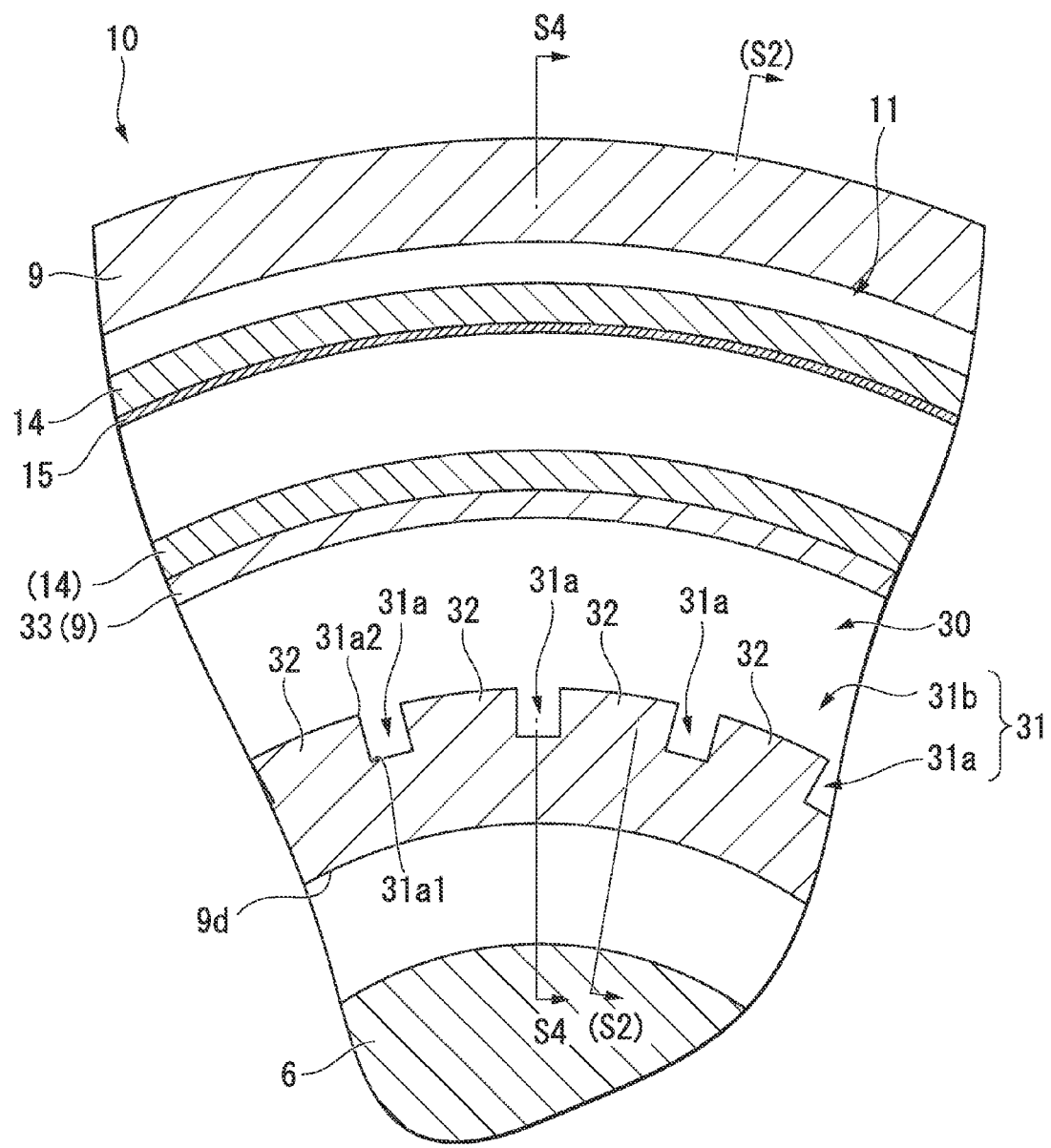
FIG. 5 is a cross-sectional view taken along the line S3-S3 in FIG. 3.
Figure 6:
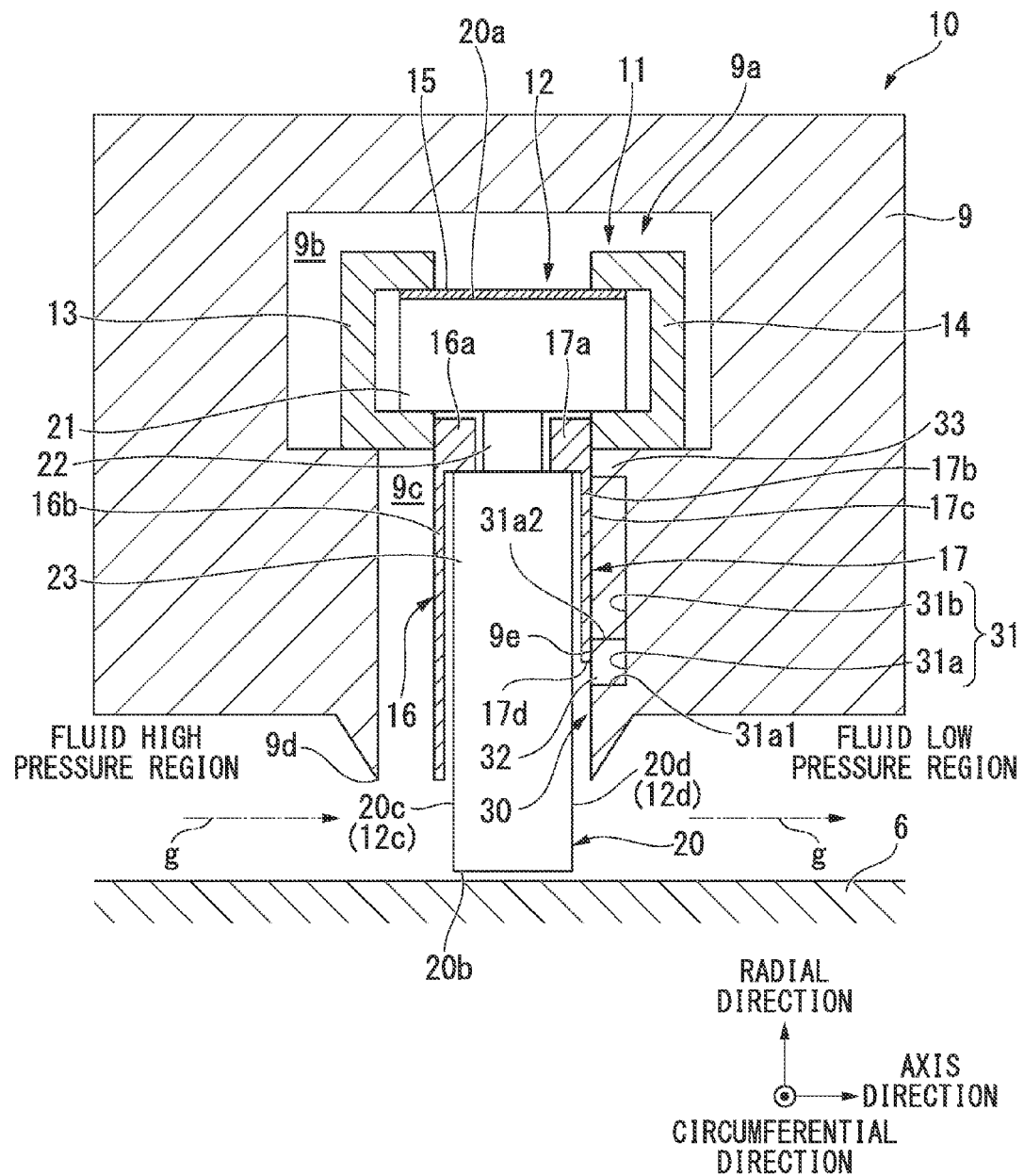
FIG. 6 is a cross-sectional view taken along the line S4-S4 in FIG. 5.

FIG. 5 is a cross-sectional view taken along the line S3-S3 in FIG. 3, and FIG. 6 is a cross-sectional view taken along the line S4-S4 in FIG. 5.

The recessed-protruding portion 30 includes a recessed portion 31 which is formed from the radially inward side toward the outward side and is recessed to the one side in the axial direction, and a protruding portion 32 which is formed to be continuous in the circumferential direction in the radially inward side and projects to the plate surface 17c side (the other side in the axial direction) with respect to the recessed portion 31.

The recessed portion 31 includes radial grooves (radial extension grooves) 31a which extends from the radially inward side toward the outward side, and a circumferential groove (circumferential extension groove) 31b which is formed in the radially outward side from the radial grooves 31a, extends in the circumferential direction, and communicates with each radial groove 31a.

As shown in FIG. 5, the dimension in the radial direction of the radial groove 31a is formed so as to be approximately the same as the width dimension of the groove, and as shown in FIGS. 3 and 6, the radial groove 31a extends from an inner end 31a1 positioned inside in the radial direction from an inner circumferential end 17d of the side seal plate 17 toward an outer end 31a2 positioned outside in the radial direction from the inner circumferential end 17d. As shown in FIG. 5, the radial grooves 31a are formed at equal intervals via the protrusions 32 in the circumferential direction.

The circumferential groove 31b extends in the circumferential direction, the radially outward side of the groove is delimited by a projecting part 33, the radial inward side of the groove is delimited by the protruding portion 32, and the groove 31b communicates with the outer end 31a2 of each radial groove 31a.

The projecting part 33 projects in the axial direction with respect to the bottom surface of the recessed portion 31 and is formed so as to be continuous in the circumferential direction, and as shown in FIGS. 3 and 6, the projecting part is opposite to a position corresponding to the base portion 17a of the plate surface 17c. The end surface of the projecting part 33 which intersects in the axial direction is formed at the same position as the end surface of the protruding portion 32 in the axial direction.

As shown in FIG. 5, the protruding portion 32 is formed in an arc strip shape and is alternately formed with the radial groove 31a in the circumferential direction.

The ends of the recessed-protruding portion 30 and the projecting part 33 in the circumferential direction are continuous with the recessed-protruding portion 30 of the housing 9 in other adjacent seal segments 11, and the recessed portion 31 communicates in the circumferential direction.

Subsequently, the operation of the above-described shaft seal mechanism 10 will be described referring to mainly FIGS. 7 to 11.

If the gas turbine 1 is operated from a stopped state, a pressure difference between the fluid low pressure region and the fluid high pressure region is increased, and in proportion to this, the seal segment 11 is pressed toward the fluid low pressure region by the combustion gas g.

Figure 7:
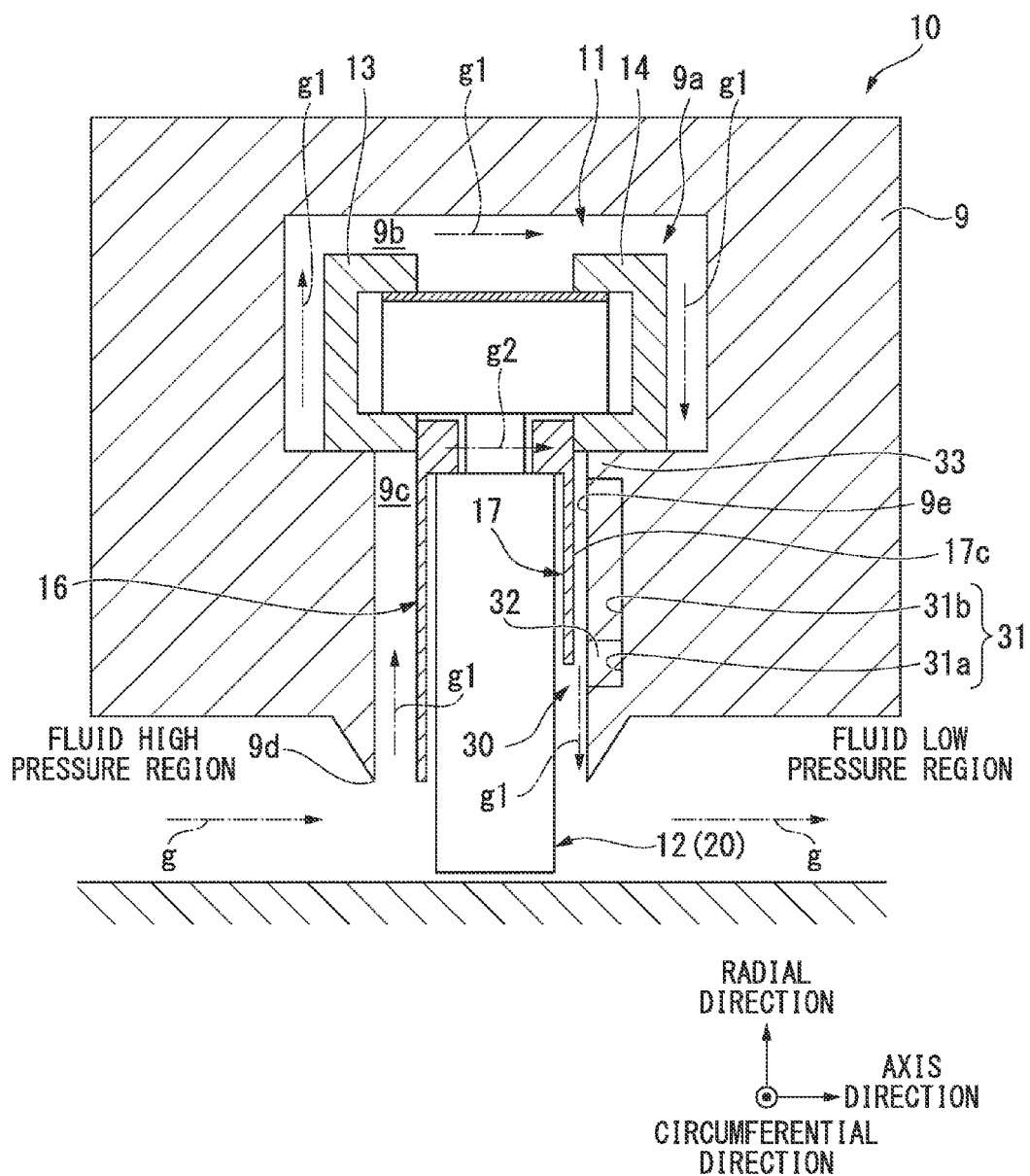
FIG. 7 is a first operational explanation view of a shaft seal mechanism 10 according to the embodiment of the present invention.

At this time, the combustion gas g, which flows from the fluid low pressure region to the fluid high pressure region, passes through the minute gap g of the thin plate seal piece 20 of the seal body 12, and as shown in FIG. 7, the combustion gas flows in the accommodation space 9a of the housing 9 from the fluid high pressure region via the opening 9d, flows to the radially outward side of the inward side space 9c along the side seal plate 16 and into the outward side space 9b, and flows in the outward side space 9b along the retaining ring 13, the rear space 15, and the retaining ring 14. Thereafter, the combustion gas flows to the radially inward side along the plate surface 17c of the side seal plate 17 and the inner wall surface 9e of the inward side space 9c, and is discharged to the fluid low pressure region (indicated by a reference numeral g1). Moreover, a portion of the combustion gas g, which flows outside in the radial direction of the inward side space 9c and reaches the base portion 16a of the side seal plate 16, passes through the gap between the side seal plate 16 and the head portion 21, the gap between the side seal plate 16 and the body portion 23, the gap between the side seal plate 16 and the neck portion 22, the gap between the side seal plate 17 and the head portion 21, and the gap between the side seal plate 17 and the body portion 23 (indicated by a reference numeral g2).

Figure 8:
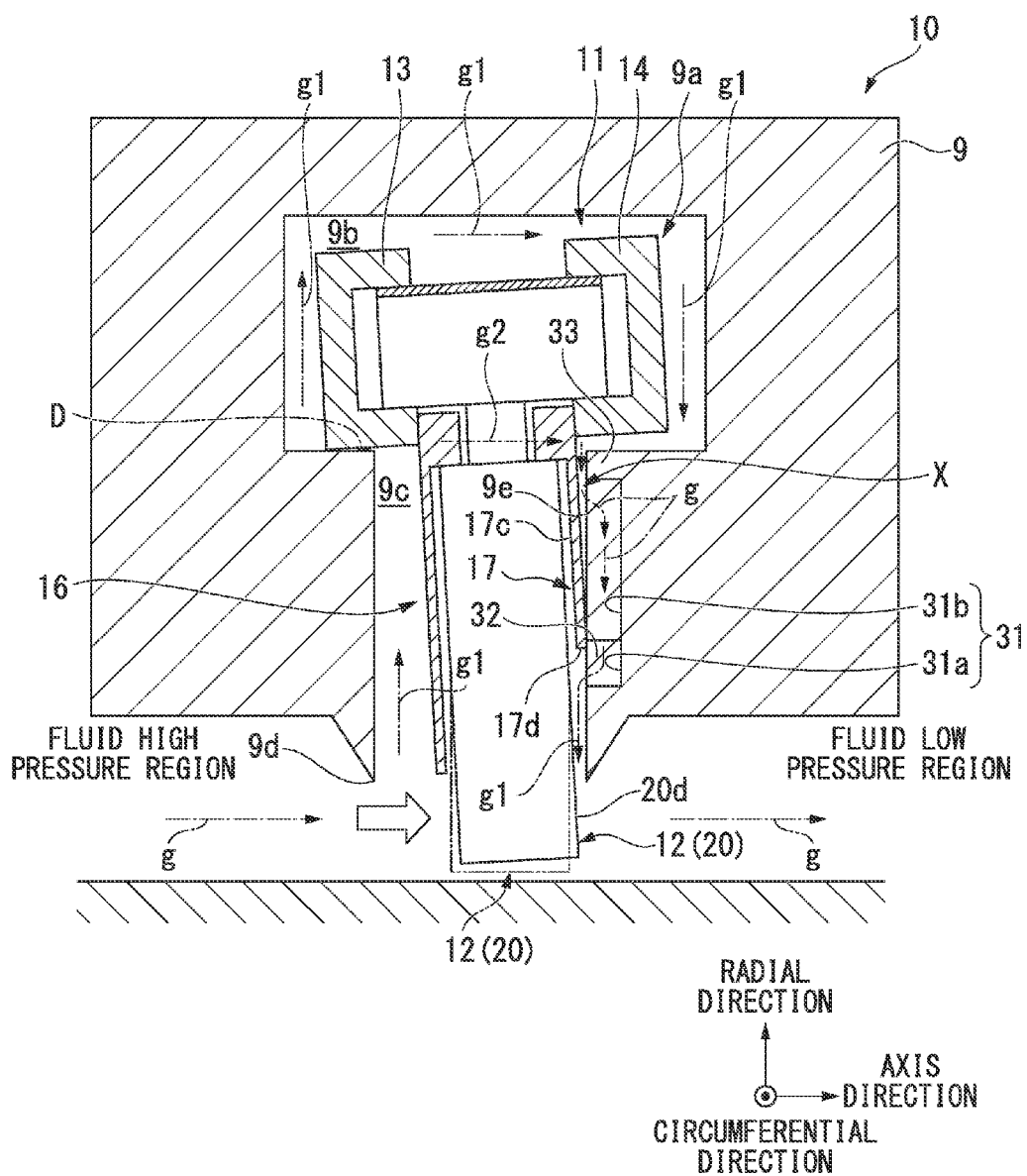
FIG. 8 is a second operational explanation view of the shaft seal mechanism 10 according to the embodiment of the present invention.

As shown in FIG. 7, before the seal segment 11 closely contacts the inner wall surface 9e of the housing 9, for example, if the displacement in the axis direction of the radially outward side of the seal segment 11 is restrained by dust D which is mixed into the accommodation space 9a of the housing 9, as shown in FIG. 8, the radially inward side (the radially inward end 20b) of the seal segment 11 is pressed by the combustion gas g and inclined to the one side in the axial direction.

The radially inward side of the inclined seal segment 11 is pressed by the combustion gas g, and thus, the inner circumferential end 17d of the side seal plate 17 comes into linearly close contact with the inner wall surface 9e (protrusion 31) of the housing 9. In this case, a pocket X, which is gradually tapered from the radially outward side toward the inward side, is formed between the plate surface 17c of the side seal plate 17 and the inner wall surface 9e.

After the combustion gas g, which flows in the inward side space 9c from the opening 9d of the housing 9, flows in the pocket X via the outward side space 9b, the combustion gas is discharged to the fluid low pressure region via the recessed portion 31. Specifically, after the combustion gas flows into the circumferential groove 31b from the pocket X, the combustion gas flows in the radial groove 31a from the outer end 31a2 to the inner end 31 a1 and is discharged to the inward side space 9c again, flows to the radially inward side along the inner wall surface 9e, and is discharged to the fluid low pressure region.

Figure 9:
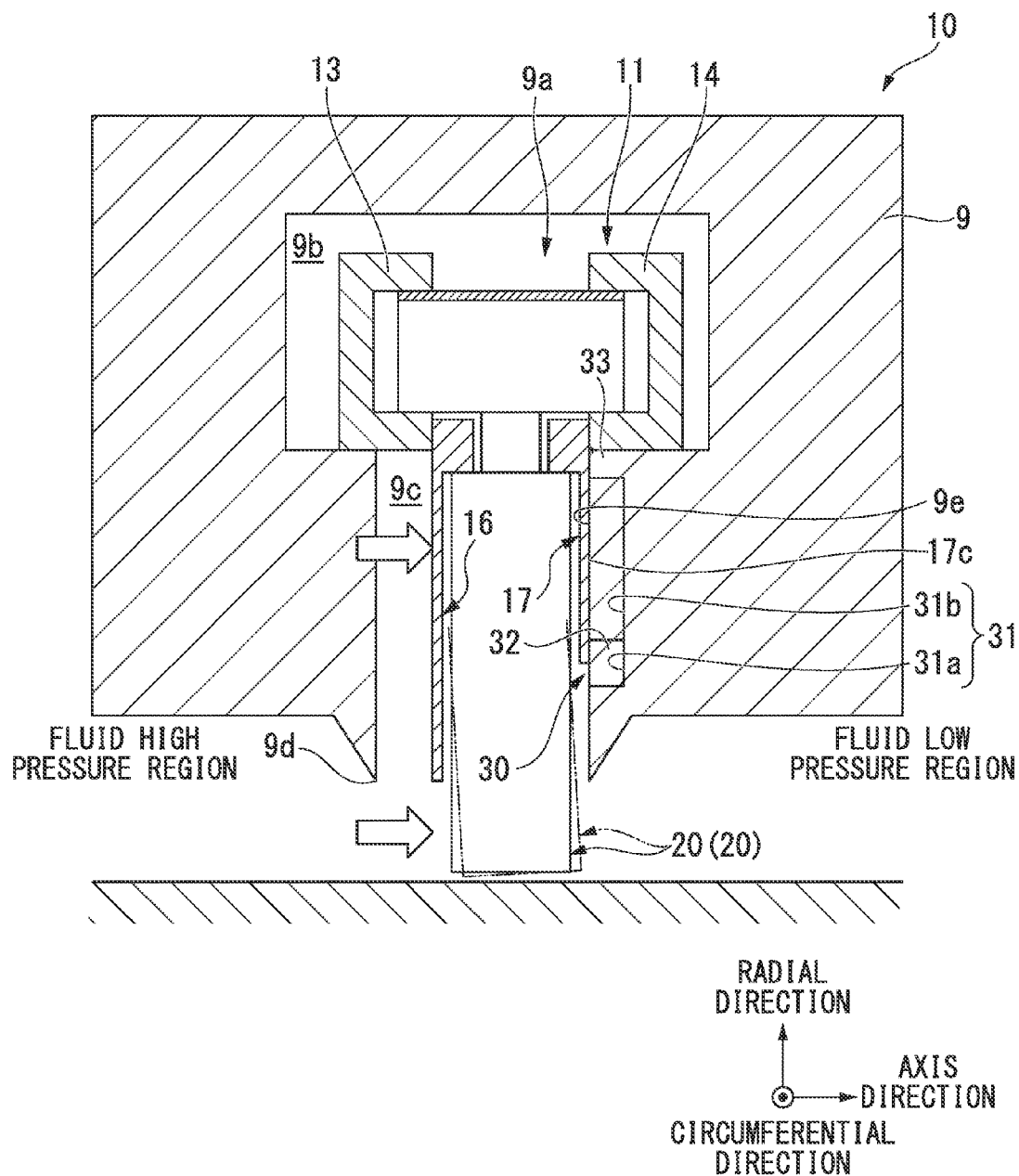
FIG. 9 is a third operational explanation view of the shaft seal mechanism 10 according to the embodiment of the present invention.

If the pressure difference between the fluid low pressure region and the fluid high pressure region is increased so as to be a predetermined value or more, the combustion gas g presses the seal body 12 and the side seal plate 16 as a whole, and thus, as shown in FIG. 9, the plate surface 17c and the inner wall surface 9e closely contact each other. In this state, since the projecting part 33 closely contacts the plate surface 17c, the combustion gases g1 and g2 which flow in the accommodation space 9a are sealed.

Moreover, since the inner wall surface 9e is pressed to the plate surface 17c, the combustion gas becomes a magnitude in which a downstream side space L (refer to FIG. 10) of the low pressure side end 12d of the seal body 12 is set.

Figure 10:
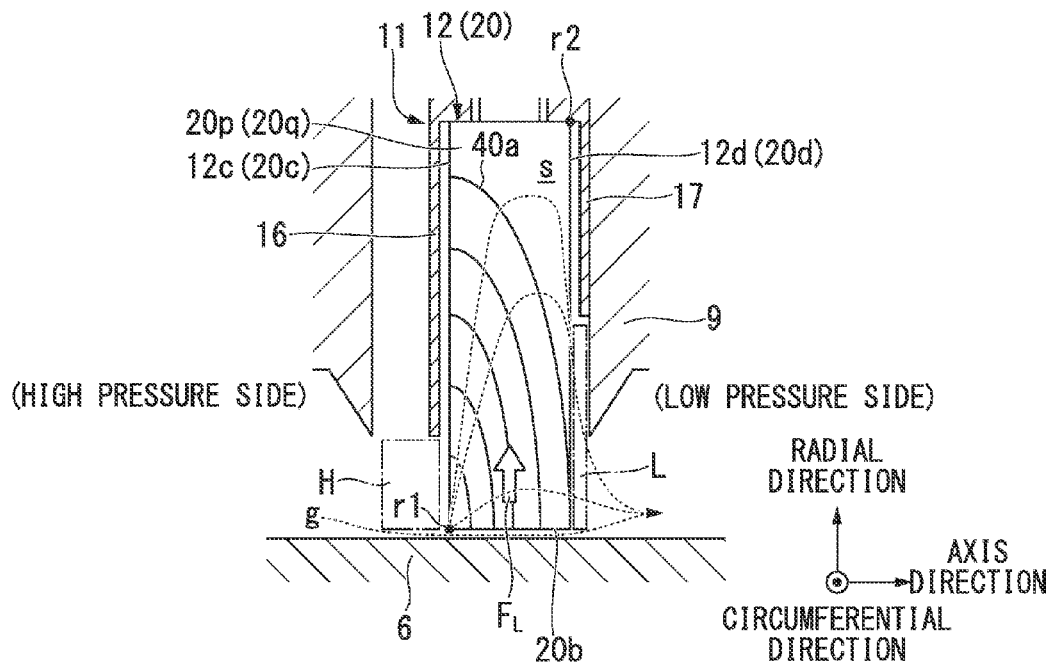
FIG. 10 is a gas pressure distribution view of a working fluid g which is formed in a minute gap s of the seal segment 11 according to the embodiment of the present invention.

On the other hand, as shown in FIG. 10, the combustion gas g entering each minute gas s radially flows in a direction from a corner r1 to a corner r2 along an upper surface 20p and a lower surface 20q opposite to each other via the minute gap s.

That is, since the dimension in the radial direction of the side seal plate 17 is larger than the dimension in the radial direction of the side seal plate 16, as shown in FIG. 9, gas pressure distribution 40a is formed in which the gas pressure is highest at the corner r1 which is positioned in the high pressure side in the inward end 20b of the thin plate seal piece 20 and the gas pressure is gradually decreased toward the corner r2 which is diagonal to the corner r1.

As shown in FIG. 10, in the gas pressure distribution 40a, the low pressure region spreads toward the outward end 20a of the thin plate seal piece 20. Thereby, as shown in FIG. 10, gas pressure distribution 40b and 40c, which is applied to the upper surface 20p and the lower surface 20q of each thin plate seal piece 20, forms a triangle distribution shape in which the gas pressure is gradually increased toward the inward end 20b of the thin plate seal piece 20 and is gradually decreased toward the outward end 20a.

Figure 11:
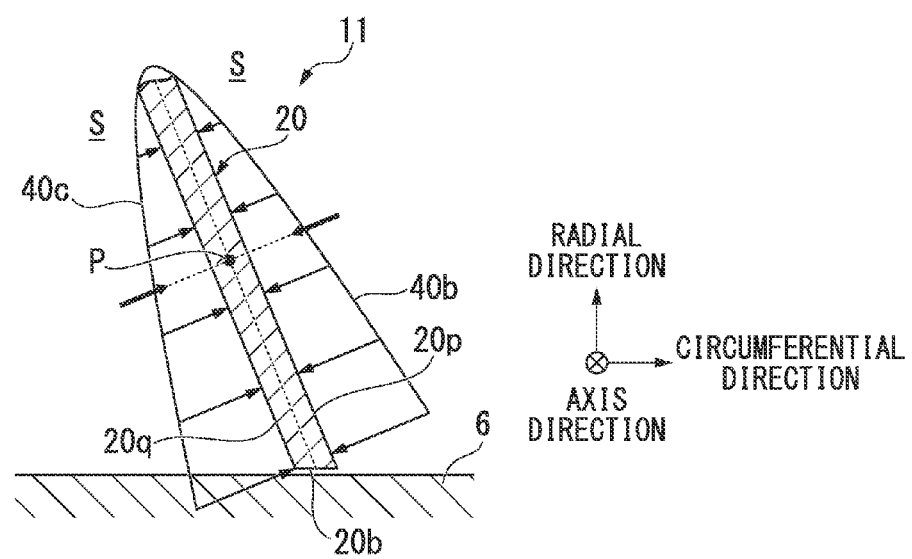
FIG. 11 is a main portion cross-sectional view of a thin plate seal piece 20 in the seal segment 11 according to the embodiment of the present invention, in which a cross-section of a body portion 22 intersecting in the axis direction of a rotary shaft 5 is shown and a pressure acting on the body portion 22 is shown by a vector.

As shown in FIG. 11, the gas pressure distribution 40b and 40c in each of the upper surface 20p and the lower surface 20q forms approximately the same shape. However, since each thin plate seal piece 20 is disposed so as to be inclined in a tangential direction of the outer circumference of the rotary shaft 6, the relative position between each of the gas pressure distribution 40b and 40c is deviated in the upper surface 20p and the lower surface 20q. Thereby, gas pressure between the upper surface 20p and the lower surface 20q is generated in an arbitrary point P from the outward end 20a of the thin plate seal piece 20 toward the inward end 20b, the gas pressure applied to the lower surface 20q is larger than the gas pressure applied to the upper surface 20p. Therefore, a floating force LF is generated in a direction in which the inward end 20b of the thin plate seal piece 20 floats from the rotary shaft 6.

In this way, the floating force FL acts on the thin plate seal piece 20 and assists a floating force due to a dynamic pressure effect.

As described above, according to the shaft seal mechanism 10 of the present embodiment, when the pocket X, which communicates with the fluid high pressure region between the plate surface 17c of the side seal plate 17 and the inner wall surface 9e of the housing 9, is formed, since the recessed portion 31 formed on the inner wall surface 9e communicates with the pocket X and the fluid low pressure region, even though the seal segment 11 is inclined to the fluid low pressure region side due to the dust D mixed between the seal segment and the accommodation space 9a of the housing 9 and the pocket X is formed, the high pressure combustion gas g flows to the fluid low pressure region via the pocket X. Thereby, the high pressure combustion gas g is not filled in the pocket X which is formed between the plate surface 17c and the inner wall surface 9e, and it is possible to prevent the seal segment 11 from being held in an inclined posture. Moreover, the combustion gas can be returned to the magnitude which designs the upstream side space H and the downstream side space L of the seal body 12, and thus, it is possible to suppress the floating force of the thin plate seal piece 20 from being decreased.

Moreover, since the communication between the fluid high pressure region and the fluid low pressure region is blocked by the projecting part 33 when the plate surface 17c and the inner wall surface 9e are pressed to each other, the communication between the fluid low pressure region and the fluid high pressure region is blocked when the inclination of the seal body 12 is eliminated. Thereby, in the posture in which the seal segment 11 is inclined, designed seal performance can be secured when the inclination of the posture is eliminated while it is possible to suppress the seal segment 11 from being held in the inclined posture.

Moreover, since the recessed-protruding portion 30 is formed only on the inner surface 9e, as described below, compared to a case where the recessed-protruding portion is formed on both the inner wall surface 9e and the plate surface 17c, labor and trouble can be alleviated.

In addition, since the recessed-protruding portion 30 is formed only on the inner wall surface 9e of the housing 9 which is thicker (the dimension in the axis direction) than the side seal plate 17, compared to a case where the recessed-protruding portion 30 is formed on the plate surface 17c, stiffness after the recessed-protruding portion is formed can be relatively easily secured. Moreover, a degree of freedom in the shape (width or depth of recessed portion 31) of the recessed-protruding portion 30 can be improved.

In addition, since a decrease of the floating force of the thin plate seal piece 20 is suppressed and the shaft seal mechanism 10 is provided so as to have a long service life, maintenance of the gas turbine can be improved.

Moreover, since the circumferential groove 31 extends in the circumferential direction and the recessed portion 31 is formed over a wide range in the circumferential direction, the pocket X and the fluid low pressure region can communicate with each other so as to correspond to the pocket X formed at indefinites locations.

Moreover, in the above-described configuration, eight seal segments 11 are disposed in the circumferential direction and the shaft seal mechanism 10 is configured. However, the shaft seal mechanism may be configured by a single seal segment or seal segments other than eight segments.

In addition, in the above-described configuration, the end in the circumferential direction is continuous with the recessed-protruding portion 30 of the housing 9 in other adjacent seal segments 11, and the recessed portion 31 communicates in the circumferential direction. However, the recesses 31 of the seal segments 11 adjacent to each other in the circumferential direction may be separated from each other.

[Second Embodiment of Shaft Seal Mechanism]

Next, a shaft seal mechanism 50 according to a second embodiment of the present invention will be described referring to drawings.

Figure 12:
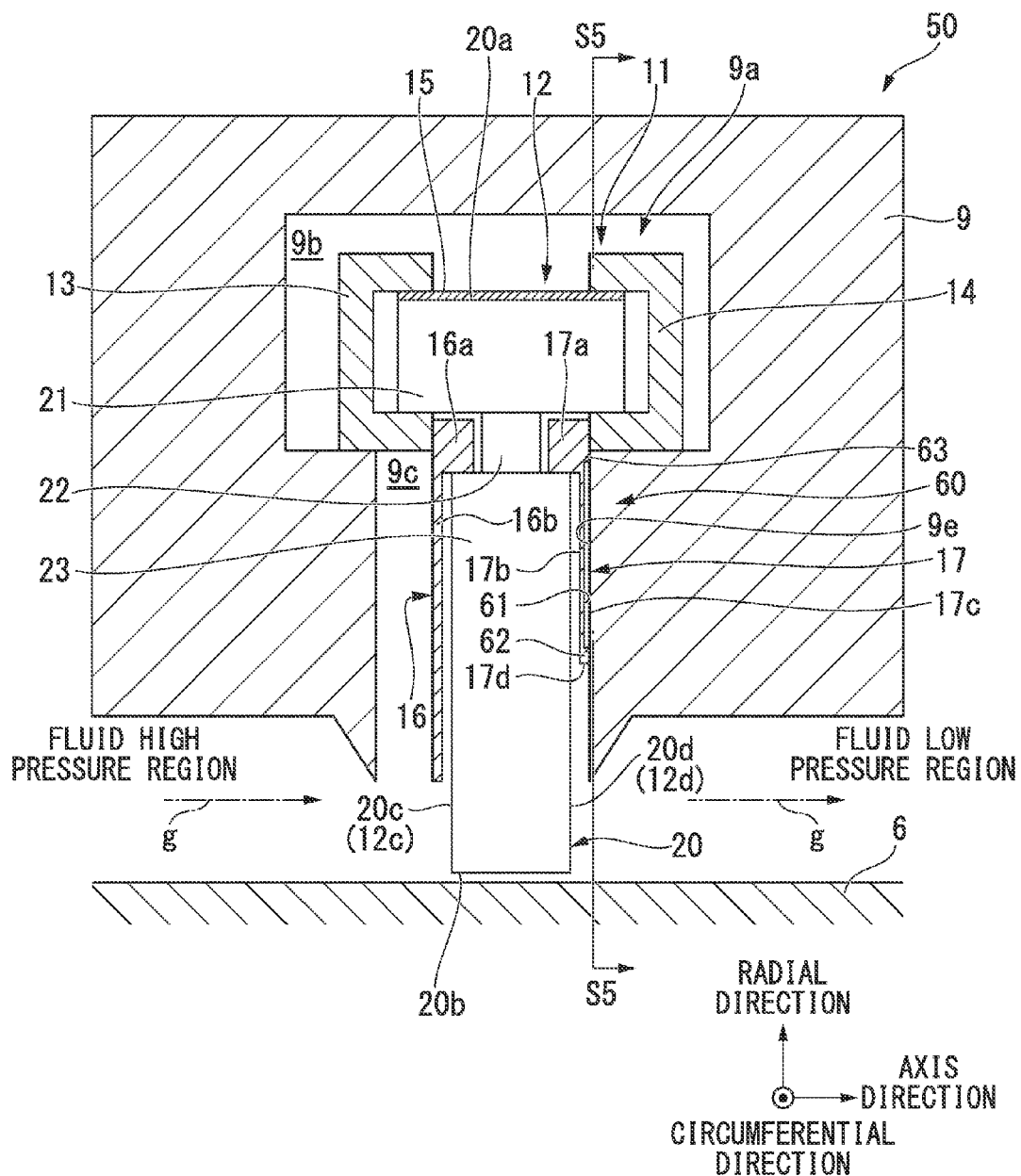
FIG. 12 is a main portion cross-sectional view of a shaft seal mechanism 50 according to a second embodiment of the present invention, in which a cross-section intersecting in the circumferential direction is shown.
Figure 13:
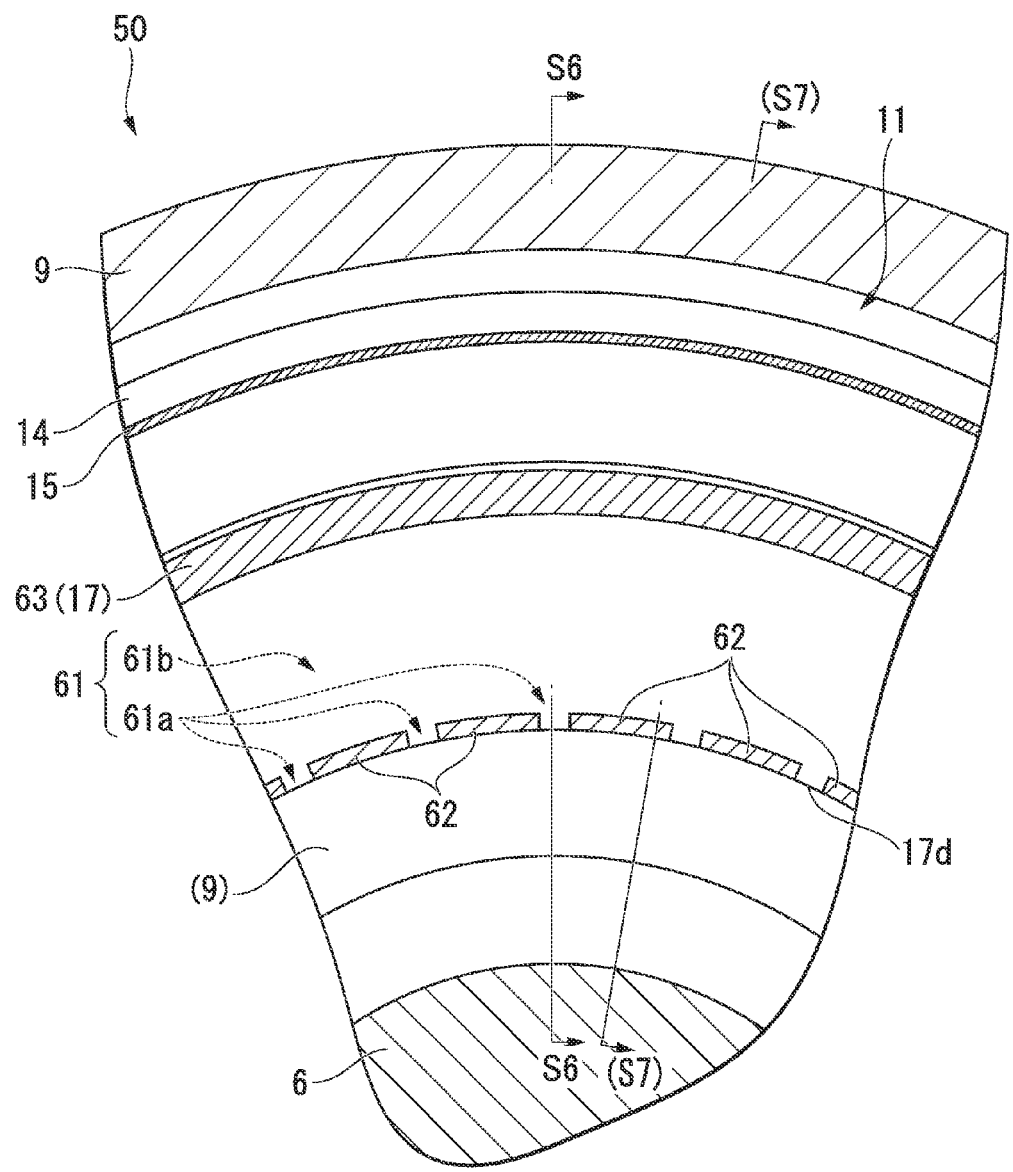
FIG. 13 is a cross-sectional view taken along the line S5-S5 in FIG. 12.
Figure 14:
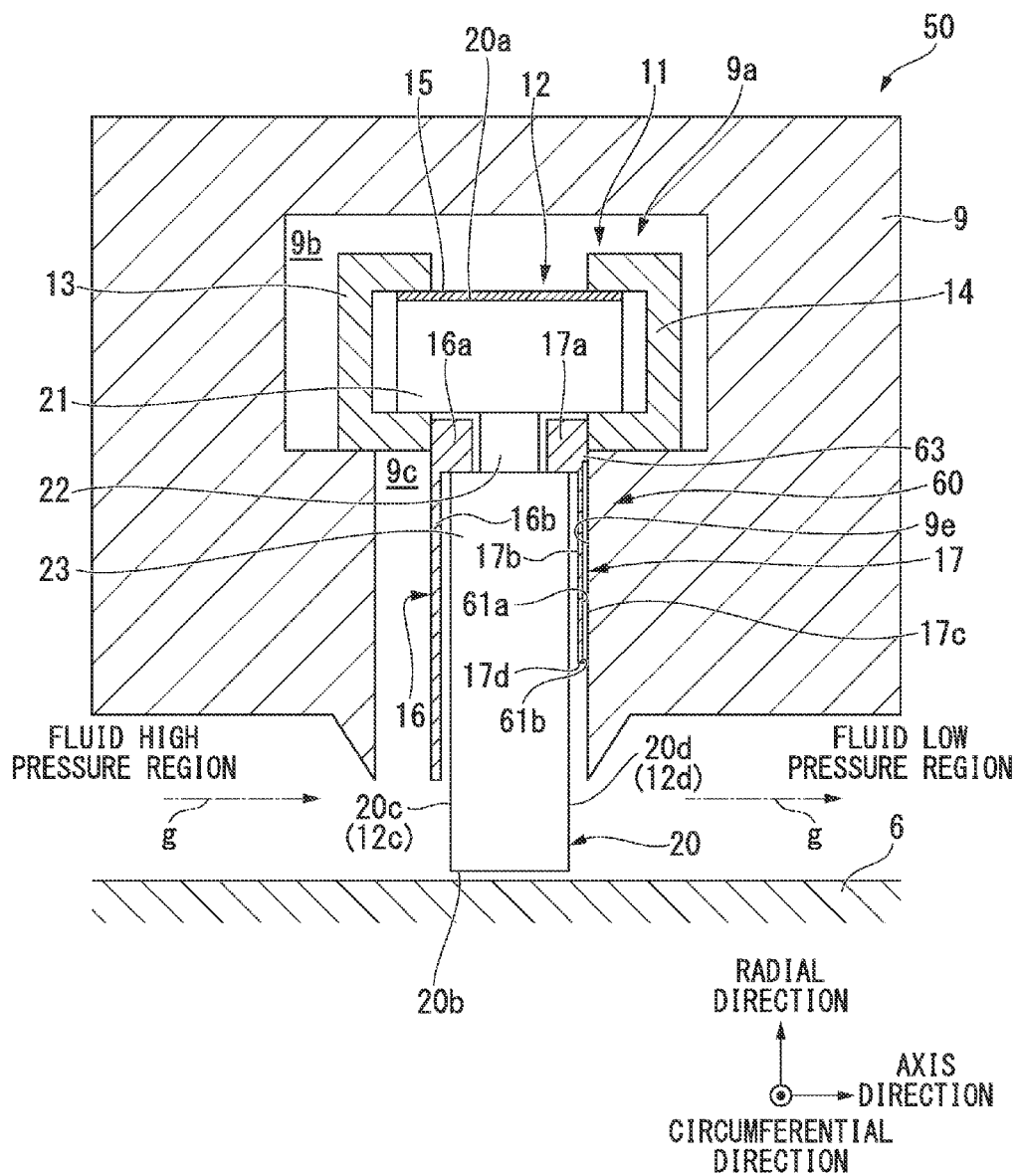
FIG. 14 is a cross-sectional view taken along the line S6-S6 in FIG. 13.

FIG. 12 is a main portion cross-sectional view (a cross-sectional view taken along the line S7-S7 in FIG. 13) which intersects in the circumferential direction of the shaft seal mechanism 50, FIG. 13 is a cross-sectional view taken along the line S5-S5 in FIG. 12, and FIG. 14 is a cross-sectional view taken along the line S6-S6 in FIG. 13. Moreover, in FIGS. 12 to 14, the same reference numerals are attached to the same components as those of FIGS. 1 to 11, and the descriptions are omitted.

The recessed-protruding portion 30 is formed only on the inner wall surface 9e of the housing 9 in the shaft seal mechanism 10. On the other hand, as shown in FIG. 12, in the shaft seal mechanism 50, a recessed-protruding portion 60 is formed only on the plate surface 17c of the side seal plate 17.

As shown in FIG. 13, the recessed-protruding portion 60 includes recesses 61 and protrusions 62.

The recessed portion 61 has approximately the same configuration as the recessed portion 31, and includes radial grooves 61a which radially extend from the inner circumferential end 17d toward the radially outward side, and a circumferential groove (extension groove in the circumferential direction) 61b which is formed in radially outward side from the radial grooves 61a and communicates with the radial groove 61a.

The protruding portion 62 has approximately the same configuration as the protruding portion 32 and is formed in plural between two radial grooves 61a adjacent in the circumferential direction.

In the plate surface 17c on which the recessed-protruding portion 60 is formed, a projecting part 63 is formed which extends in the circumferential direction in the radially outward side, projects from the bottom surface of the circumferential groove 31b toward the inner wall surface 9e, and delimits the outer circumferential side in the radial direction of the circumferential groove 31b. The end surface of the projecting part 63 which intersects in the axial direction is formed at the same position as the end surface of the protruding portion 62 in the axial direction.

According to this configuration, when the seal segment 11 has the posture inclined to the fluid low pressure side and the inner circumferential end 17d of the side seal plate 17 abuts the inner wall surface 9e, the recessed portion 61 (radial groove 61a) communicates with the pocket X and the fluid low pressure region. Moreover, as shown in FIG. 13, if the plate surface 17c is pressed to the inner wall surface 9e, the projecting part 63 closely contacts the inner wall surface 9e, and the combustion gases g1 and g2 (refer to FIGS. 7 and 8) are sealed.

Thereby, effects similar to the above-described effects can be obtained.

Moreover, since the recessed-protruding portion 60 is formed only on the plate surface 17c of the side seal plate 17, the recessed-protruding portion can be easily formed compared to the inner wall surface 9e of the housing 9. In addition, the configuration of the present invention can be obtained by exchanging only the side seal plate 17 of the existing shaft seal mechanism.

[Third Embodiment of Shaft Seal Mechanism]

Next, a shaft seal mechanism 70 according to a third embodiment of the present invention will be described referring to drawings.

Figure 15:
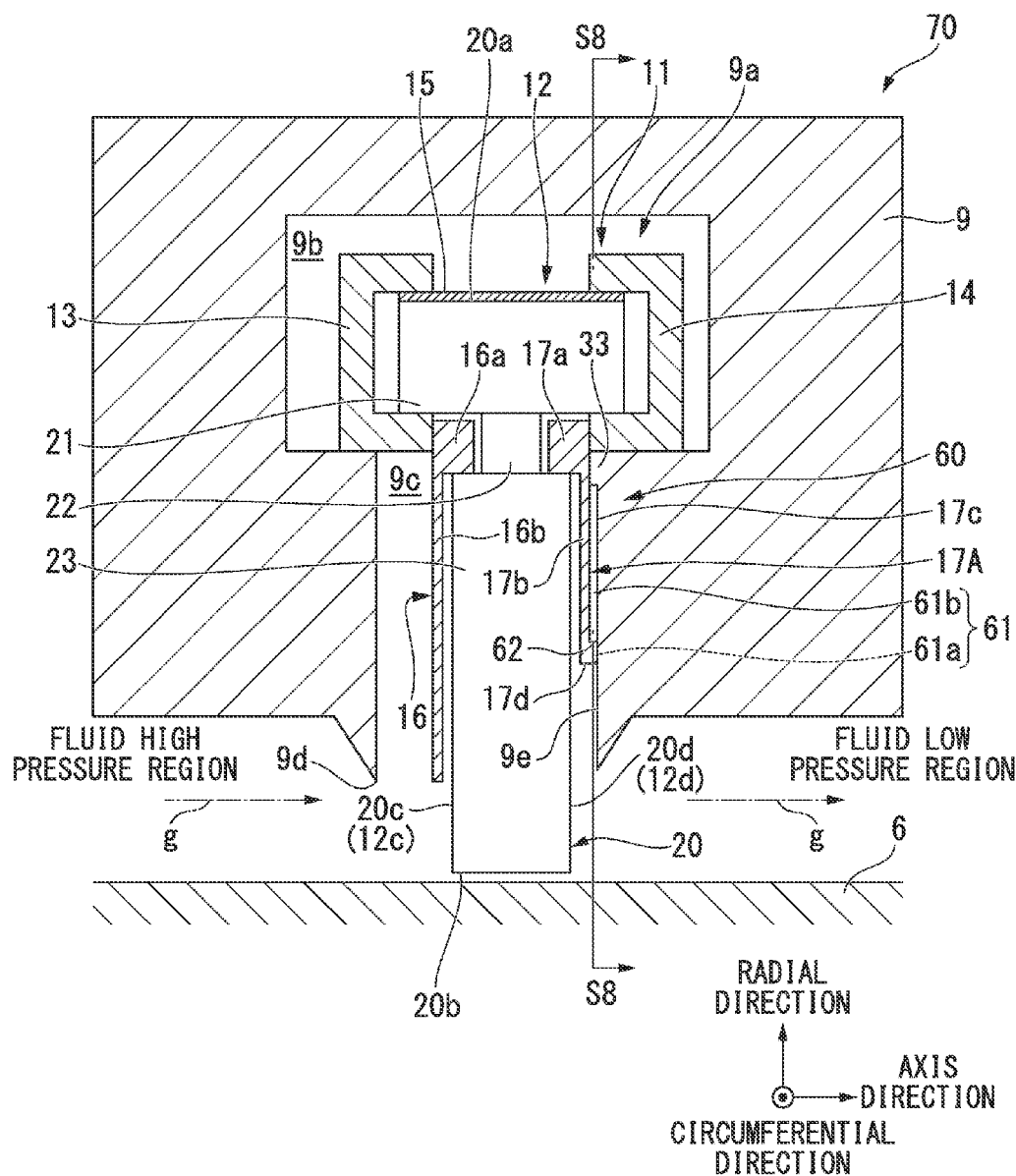
FIG. 15 is a main portion cross-sectional view of a shaft seal mechanism 70 according to a second embodiment of the present invention, in which a cross-section intersecting in the circumferential direction is shown.
Figure 16:
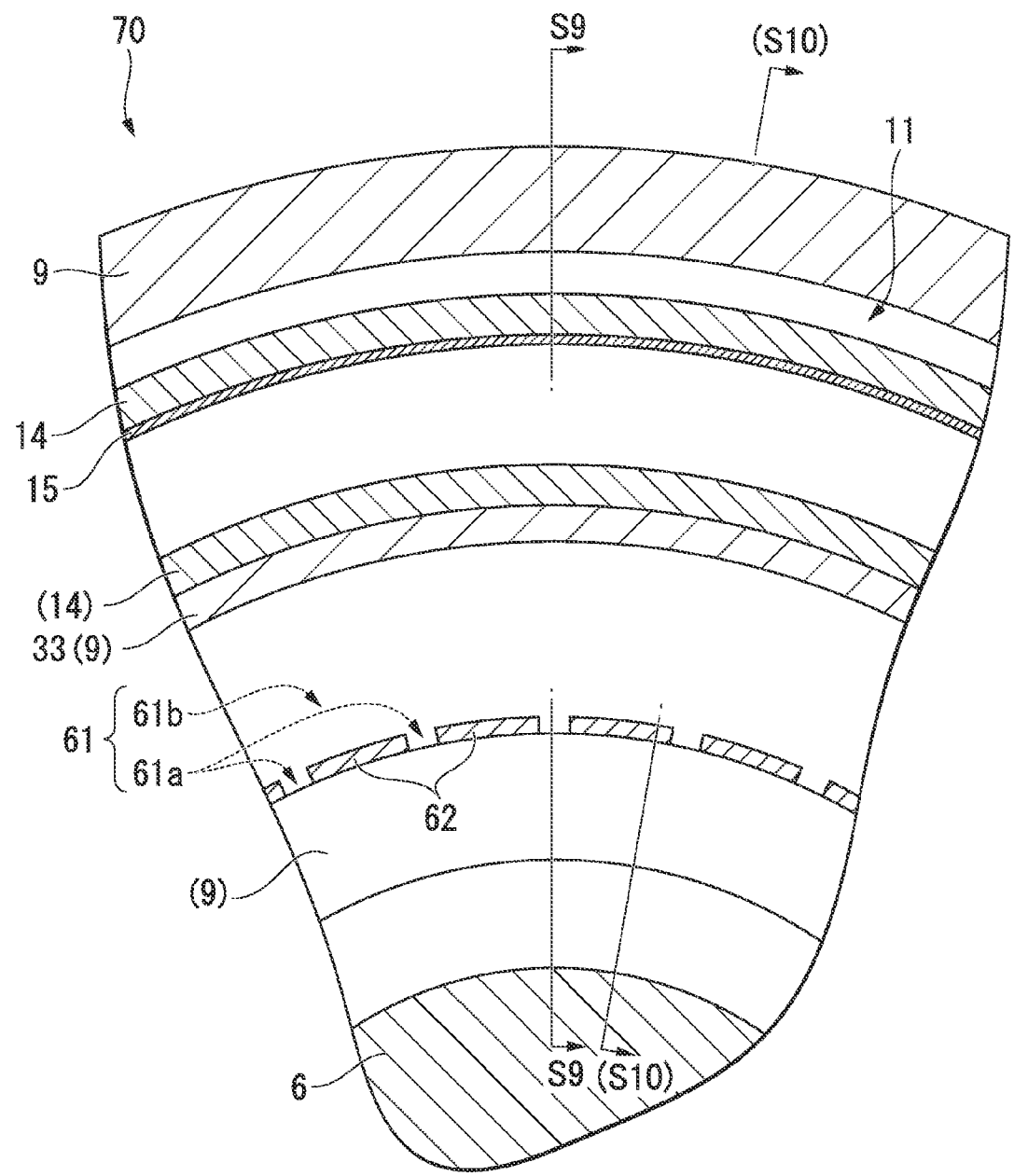
FIG. 16 is a cross-sectional view taken along the line S8-S8 in FIG. 15.
Figure 17:
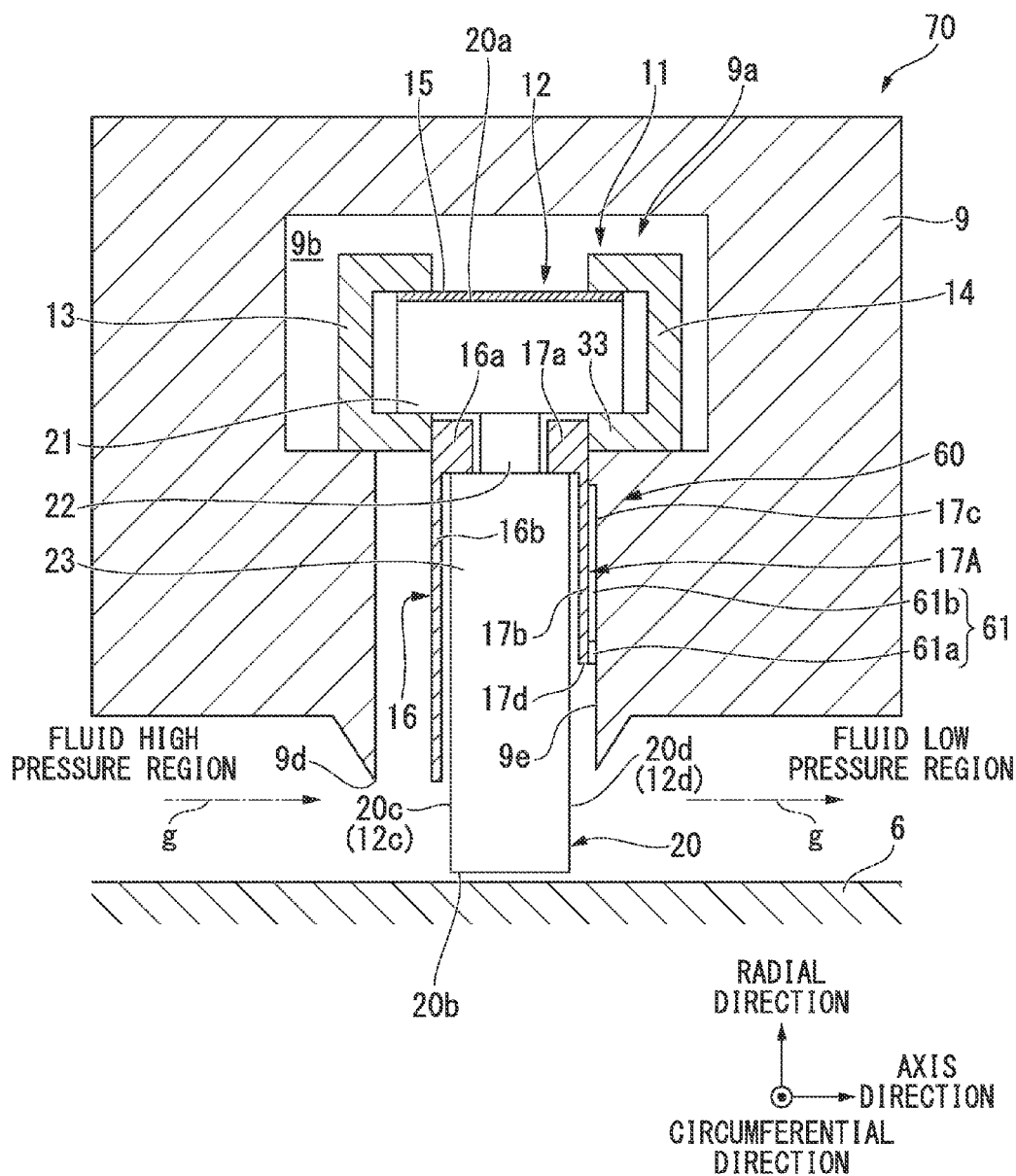
FIG. 17 is a cross-sectional view taken along the line S9-S9 in FIG. 16.

FIG. 15 is a main portion cross-sectional view (a cross-sectional view taken along the line S10-S10 in FIG. 16) which intersects in the circumferential direction of the shaft seal mechanism 70, FIG. 16 is a cross-sectional view taken along the line S8-S8 in FIG. 15, and FIG. 17 is a cross-sectional view taken along the line S9-S9 in FIG. 16. Moreover, in FIGS. 15 to 17, the same reference numerals are attached to the same components as those of FIGS. 1 to 14, and the descriptions are omitted.

The shaft seal mechanism 70 is different from the shaft seal mechanisms 10 and 50 in that the shaft seal mechanism 70 includes a projecting part 33 and a side seal plate 17A.

In the side seal plate 17A, a recessed-protruding portion 60 similar to the side seal plate 17 of the second embodiment is formed. However, the side seal plate 17A is different from the side seal plate 17 in that the projecting part 63 is not formed in the side seal plate 17A. That is, the recessed portion 61 of the side seal plate 17A is formed up to the outer end of the side seal plate 17A while the recessed portion 61 (circumferential groove 61b) of the side seal plate 17 of the second embodiment is formed up to the projecting part 63.

As shown in FIGS. 15 and 16, the projecting part 33 projects in the axis direction from the inner wall surface 9e toward the plate surface 17c by approximately the same height as the height (the height from the bottom surface of the recessed portion 31) of the protruding portion 62 of the side seal plate 17A.

According to this configuration, when the seal segment 11 has the posture inclined to the fluid low pressure side and the inner circumferential end 17d of the side seal plate 17A abuts the inner wall surface 9e, the recessed portion 61 (radial groove 61a) communicates with the pocket X and the fluid low pressure region. Moreover, as shown in FIGS. 15 and 17, if the plate surface 17c is pressed to the inner wall surface 9e, the projecting part 33 closely contacts the bottom surface of the recessed portion 61, and the combustion gases g1 and g2 (refer to FIGS. 7 and 8) are sealed.

Thereby, effects similar to the above-described effects can be obtained.

Moreover, since the projecting part 33 is formed on the inner wall surface 9e while the recessed-protruding portion 60 is formed on the plate surface 17c of the side seal plate 17A, for example, even when limitation of the formation positions of the recessed-protruding portion and the projecting part exist due to the dimensions, the shape, or the like of the retaining ring 14 or the housing 9, the shaft seal mechanism 70 can cope to the limitation flexibly, and a degree of freedom of the design can be improved.

Moreover, in the above-described configuration, the recessed-protruding portion 60 is formed on the side seal plate 17A and the projecting part 33 is formed on the accommodation body 9. However, the projecting part 33 is omitted while the recessed-protruding portion 30 is formed in the accommodation body 9, and the projecting part 63 may be formed on the side seal plate 17.

In addition, the operation procedure, the shapes or the combination of respective components, and the like, which are shown in the above-described embodiments, are an example, and can be variously modified based on requirement of the design within a scope which does not depart from the gist of the present invention.

For example, in the above-described embodiments, the housing 9 is separated from the stator (hub shroud and bearings 2c and 4c). However, the housing 9 may be integrally formed with the stator.

Moreover, in each embodiment described above, one of the recessed-protruding portion 30 and the recessed-protruding portion 60 is used. However, both the recessed-protruding portions 30 and 60 are used and the protrusions 32 and 62 may abut each other. According to this configuration, the depths of both recesses 31 and 61 are formed so as to be small, and the communication space between the pocket X and the low pressure side space can be manufactured so as to be increased.

Similarly, both projections 33 and 63 are used, the projections 33 and 63 closely contact each other, and thus, the communication between the fluid high pressure region and the fluid low pressure region may be blocked.

Moreover, in each embodiment described above, the shapes and the configurations of the recessed-protruding portion 30 and the recessed-protruding portion 60 are examples, and are not limited to the above-described shape or the configuration. For example, in the radial groove 31*a*, the dimension in the radial direction and the width dimension of the groove do not necessarily have the same dimension to each other, and the radial grooves are not necessarily need to be formed at equal intervals. Similarly, the radial groove 31*a* is not formed in plural, and only one radial groove 31*a* may be formed.

In addition, in each embodiment described above, the circumferential groove 31*b* is formed in each of the recessed-protruding portions 30 and 70. However, the circumferential groove 31*b* may be omitted, and circumferential grooves may be formed. In this case, the radial groove 31*a* may extend up to the radially outward side.

INDUSTRIAL APPLICABILITY

In a rotary machine such as a gas turbine or a steam turbine, a leak amount of a working fluid from a high pressure side to a low pressure side can be decreased.

REFERENCE SIGNS LIST

1: Gas turbine (rotary machine)
2: Compressor (rotary machine)
2A: Rotor
2B: Stator
4: Turbine (rotary machine)
4A: Rotor
4B: Stator
9: Housing (accommodation body)
9*a*: Accommodation space
9*d*: Opening
9*e*: Inner wall surface
10, 10*c*, 50, and 70: Shaft seal mechanism
12: Seal body
12*c*: High pressure side end (one end)
12*d*: Low pressure side end (the other end)
17 and 17A: Side seal plate (plate body)
20: Thin plate seal piece
20*a*: Outward end (radially outward end)
20*b*: Inward end (radially inward end)
30 and 60: Recessed-protruding portion
31 and 61: Recessed portion
31*a* and 61*a*: Radial groove (radial extension groove)
31*b* and 61*b*: Circumferential groove (circumferential extension groove)
32 and 62: Protruding portion
33 and 63: Projecting part
X: Pocket
g (g1 and g2): Combustion gas (fluid)
s: Minute gap

The invention claimed is:

1. A shaft seal mechanism for sealing a gap between a stator and a rotor of a rotary machine, and dividing the gap into a fluid low pressure region on one side of the rotor in an axial direction and a fluid high pressure region on another side of the rotor in the axial direction, the shaft seal mechanism comprising:
 a housing provided in the stator and having an accommodation space extending in a circumferential direction of the rotor, the accommodation space opening toward an outer circumference of the rotor; and
 a seal segment loosely accommodated in the accommodation space and moveable therein in both the axial direction and a radial direction, wherein
 the seal segment includes:
  a seal body including a plurality of thin plate seal pieces that overlap each other in the circumferential direction of the rotor, the seal body being accommodated in the accommodation space and extending toward the outer circumference of the rotor through the opening of the accommodation space;
  a side seal plate located between the seal body and an inner wall surface of the housing at the one side of the seal body in the axial direction, the side seal plate having a plate surface that faces away from the thin plate seal pieces and faces toward the inner wall surface of the housing; and
  a recessed-protruding portion formed on one of the plate surface of the side seal plate and the inner wall surface of the housing, the recessed-protruding portion including a recessed portion formed from a radially inward side toward a radially outward side and recessed to one side in the axial direction, the recessed portion including at least one radial groove extending in the radial direction, and at least one protruding portion projecting in the axial direction with respect to the radial groove, and at least a portion of the radial groove extending to be between the side seal plate and the housing,
 wherein the shaft seal mechanism is configured so that, when the seal segment inclines such that a radially inner end of the side seal plate linearly contacts the inner wall surface of the housing via the protruding portion, a pocket is formed between the plate surface of the side seal plate and the inner wall surface of the housing that communicates with the fluid low pressure region through the radial groove.

2. The shaft seal mechanism according to claim 1, further comprising:
 a projecting part which is formed at a radially outward side on the one of the plate surface of the side seal plate and the inner wall surface of the housing and which projects in the axial direction with respect to the radial groove,
 wherein the projecting part blocks off a connection between the fluid high pressure region and the fluid low pressure region by tightly abutting to another of the plate surface of the side seal plate and the inner wall surface of the housing when the plate surface is pressed to the inner wall surface of the housing.

3. The shaft seal mechanism according to claim 1,
 wherein the recessed-protruding portion further includes a circumferential groove located at a radially outward side from the radial groove, the circumferential groove extending in the circumferential direction, communicating with the radial groove, and being located between the side seal plate and the housing.

4. The shaft seal mechanism according to claim 1,
 wherein the radial groove and the protruding portion are formed only on the plate surface of the side seal plate.

5. The shaft seal mechanism according to claim 1,
 wherein the radial groove and the protruding portion are formed only on the inner wall surface of the housing.

6. A rotary machine comprising the shaft seal mechanism according to claim 1.

7. The shaft seal mechanism according to claim 2, wherein the recessed-protruding portion further includes a circumferential groove located at the radially outward side from the radial groove, the circumferential groove extending in the circumferential direction, communicating with the radial groove, and being located between the side seal plate and the housing.

8. The shaft seal mechanism according to claim 1, wherein
the radial groove is a plurality of radial grooves and the protruding portion is a plurality of protruding portions,
the radial grooves and the protruding portions are formed on the inner wall surface of the housing, and
the protruding portions are formed to be continuous in the circumferential direction in the radially inward side thereof.

9. The shaft seal mechanism according to claim 3, wherein the circumferential groove is formed on the one of the plate surface of the side seal plate and the inner wall surface of the housing.

10. The shaft seal mechanism according to claim 3, wherein the circumferential groove is formed on another of the plate surface of the side seal plate and the inner wall surface of the housing.

11. The shaft seal mechanism according to claim 1, wherein the radial groove is a plurality of radial grooves and the protruding portion is a plurality of protruding portions.

* * * * *